(12) United States Patent
Yokoyama et al.

(10) Patent No.: US 7,551,978 B2
(45) Date of Patent: Jun. 23, 2009

(54) SYSTEM FOR CARRYING AN ITEM

(75) Inventors: Taro Yokoyama, Wako (JP); Kenichiro Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 11/301,099

(22) Filed: Dec. 13, 2005

(65) Prior Publication Data

US 2006/0142896 A1 Jun. 29, 2006

(30) Foreign Application Priority Data

Dec. 14, 2004 (JP) ............................. 2004-361467

(51) Int. Cl.
- *G05B 15/00* (2006.01)
- *G05B 21/00* (2006.01)
- *B65H 1/00* (2006.01)
- *B66C 23/00* (2006.01)

(52) U.S. Cl. .................. 700/245; 700/258; 700/259; 700/280; 414/255.01; 414/226.01; 414/226.02; 414/741; 414/936; 901/33; 901/30; 901/31; 901/46; 901/34

(58) Field of Classification Search .................. None
See application file for complete search history.

(56) References Cited

U.S. PATENT DOCUMENTS

| | | | | |
|---|---|---|---|---|
| 4,575,297 A | * | 3/1986 | Richter | 414/5 |
| 4,617,502 A | * | 10/1986 | Sakaue et al. | 318/568.18 |
| 4,946,380 A | * | 8/1990 | Lee | 623/24 |
| 5,373,747 A | * | 12/1994 | Ogawa et al. | 73/862.581 |

(Continued)

FOREIGN PATENT DOCUMENTS

EP 1 415 772 A2 5/2004

(Continued)

OTHER PUBLICATIONS

Nagatya, K. et al., "Delivery by Hand between Human and robot Based on Fingertip force-Torque Information", IEEE/RSJ International Conference; Oct. 13, 1998, pp. 750-757.

(Continued)

*Primary Examiner*—Dalena Tran
*Assistant Examiner*—Ian Jen
(74) *Attorney, Agent, or Firm*—Squire, Sanders & Dempsey, L.L.P.

(57) ABSTRACT

The item-carrying system comprises: a robot comprising: a gripping portion for gripping an item; external force detecting means for detecting an external force applied to the gripping portion; opening-degree detecting means for detecting an opening-degree of the gripping portion; autonomous movement means; and receiving/passing motion deciding means for deciding a motion of the robot in an item receiving/passing operation, wherein the receiving/passing motion deciding means comprises: means for determining to start receiving an item that causes the gripping portion to start a receiving motion if the external force detecting means has detected an external force not less than a first predetermined value, when the gripping portion is not gripping an item; and means for determining the completion of a receiving motion on the basis of at least one of an external force and an opening-degree during the receiving motion.

16 Claims, 25 Drawing Sheets

U.S. PATENT DOCUMENTS

| | | | |
|---|---|---|---|
| 6,580,246 B2 * | 6/2003 | Jacobs | 318/568.16 |
| 6,584,375 B2 * | 6/2003 | Bancroft et al. | 700/213 |
| 6,667,592 B2 * | 12/2003 | Jacobs et al. | 318/568.12 |
| 7,206,753 B2 * | 4/2007 | Bancroft et al. | 705/10 |
| 7,222,904 B2 * | 5/2007 | Matsuda | 294/111 |
| 2002/0165638 A1 * | 11/2002 | Bancroft et al. | 700/213 |
| 2002/0165643 A1 * | 11/2002 | Bancroft et al. | 700/245 |
| 2003/0030398 A1 * | 2/2003 | Jacobs et al. | 318/568.12 |
| 2003/0030399 A1 * | 2/2003 | Jacobs | 318/568.16 |
| 2005/0117033 A1 * | 6/2005 | Matsui | 348/239 |
| 2006/0047361 A1 * | 3/2006 | Sato et al. | 700/245 |
| 2006/0158146 A1 * | 7/2006 | Tadano | 318/568.21 |
| 2007/0018470 A1 * | 1/2007 | Hayakawa et al. | 294/106 |

FOREIGN PATENT DOCUMENTS

| | | |
|---|---|---|
| JP | 2002-346957 | 12/2002 |
| JP | 2004-167674 | 6/2004 |

OTHER PUBLICATIONS

Zecca, M. et al., "*On the Development of the Emotion Expression Humannoid Robot WE-4RII with RCH-1*" IEEE International Conference, Nov. 10, 2004, pp. 235-252.

Kim, I. et al., "*Control of a robot Hand Emulating Human's Hand-Over Motion*", Mechatronics vol. 12, No. 1,Feb. 1, 2002, pp. 55-69.

Jinsul, Kim et al., "*Advanced GraspPlanning for Handover Operation Between Human and Robot: Three Handover Methods in Esteem Etiquettes Using Dual Arms and hands of Home-Service Robot*", XP-002374816, Dec. 13, 2004.

Nagata et al., "Delivery Between Human and Robot Based on Fingertip Force/Torque Information", H104-4074-US01, Proceedings of the 16th Annual Conference of the Robotics Society of Japan, Robotic Society of Japan, Tokyo, Japan, Sep. 18, 1998, pp. 1-8.

* cited by examiner

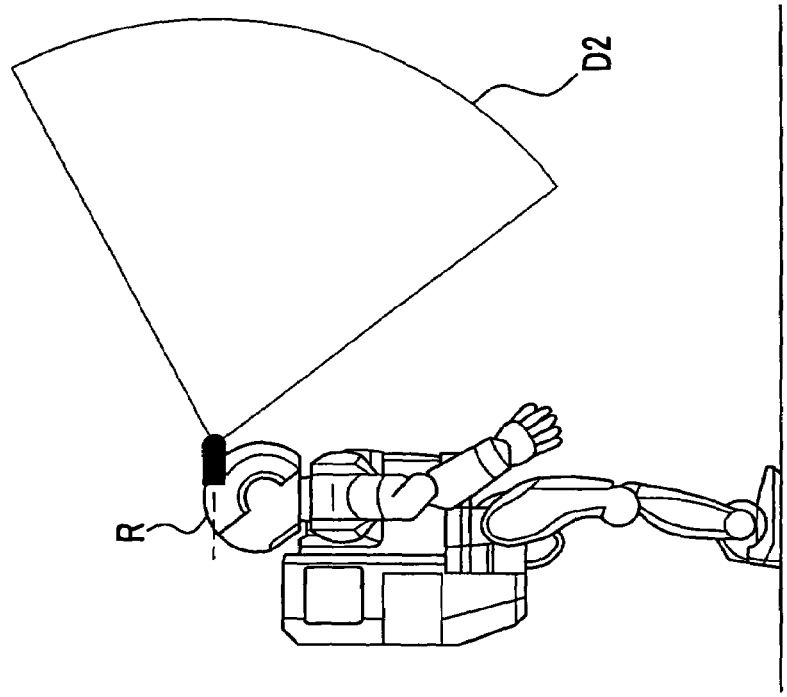
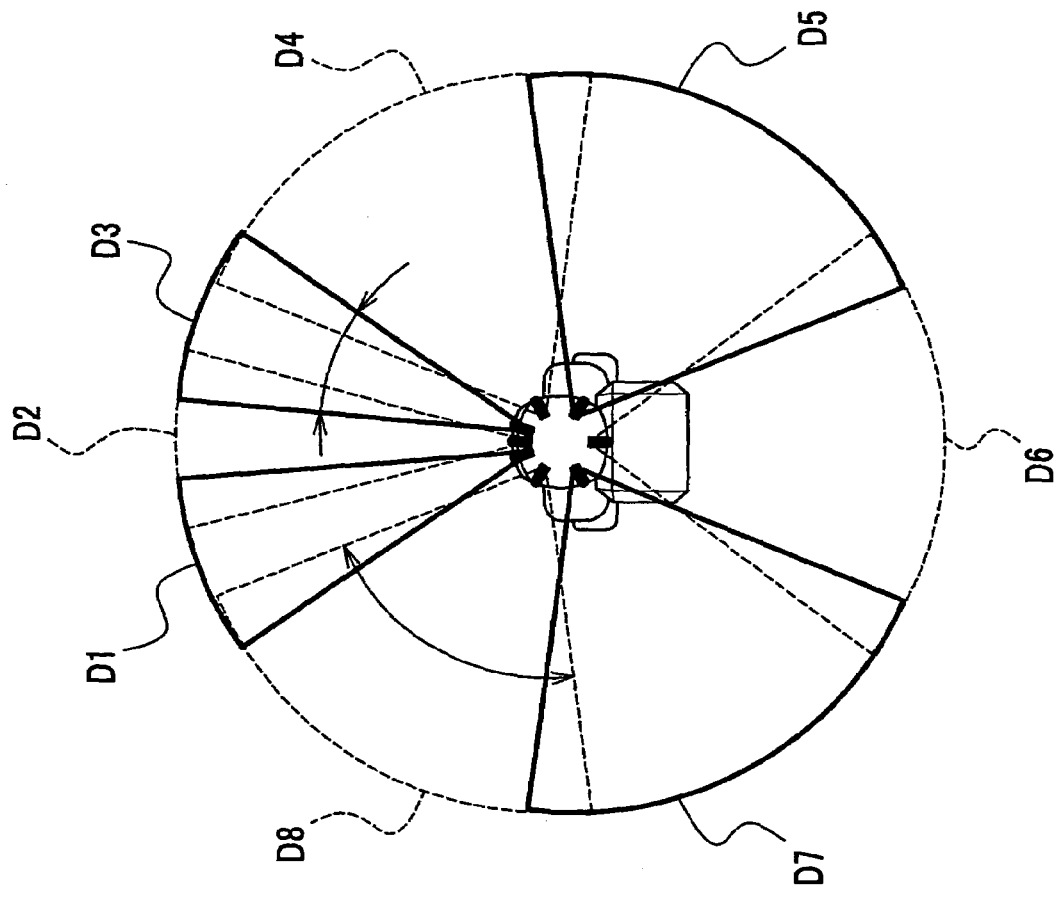

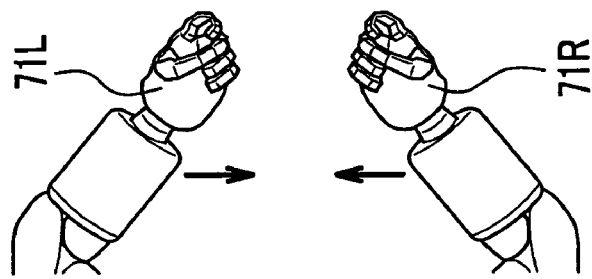
FIG.20C
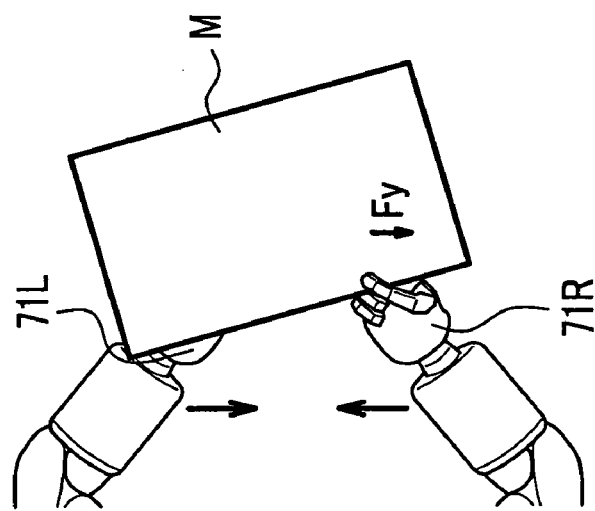
FIG.20B
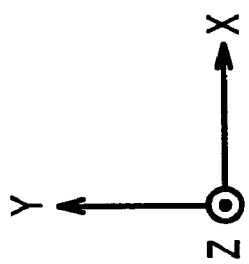
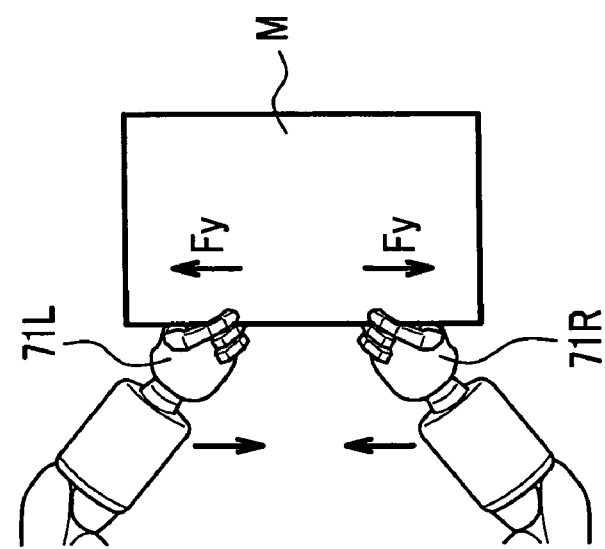
FIG.20A

Flow of moving to the item storage site

SYSTEM FOR CARRYING AN ITEM

BACKGROUND OF THE INVENTION

1. Field of the Invention

The present invention pertains to an item-carrying system using a robot that can move autonomously.

2. Description of the Related Art

In recent years, studies have been made to make an autonomously movable robot to carry an item. Such a robot makes motions of receiving/passing the item from/to a human when carrying the item, and therefore it is desired to control the robot to perform the motions without giving the human a sense of discomfort. A robot gripping control unit as disclosed in Japanese Patent Application Laid-Open (Kokai) No. 2004-167674 is for providing a control for a robot which is gripping an item and passes to a human.

However, the robot described in the above patent document has a disadvantage of being an art that mainly assumes a situation in which the robot gripping the item passes it to a human, and therefore the robot can possibly give the human a sense of discomfort that the robot is forcibly snatching the item.

The present invention is conceived to solve this problem, and aims to provide an item-carrying system that allows the robot to receive the item from the human without giving the sense of discomfort thereto.

SUMMARY OF THE INVENTION

To solve the above-mentioned problem, item 1 of the present invention provides an item-carrying system comprising: a robot comprising: a gripping portion for gripping an item and can open/close; external force detecting means for detecting an external force applied to the gripping portion; opening-degree detecting means for detecting an opening-degree of the gripping portion; and autonomous movement means; and receiving/passing motion deciding means for deciding a motion of the robot in an item receiving/passing operation, the system receiving/passing the item with the gripping portion, wherein the receiving/passing motion deciding means comprises: means for determining to start receiving an item that causes the gripping portion to start a receiving motion if the external force detecting means has detected an external force not less than a first predetermined value, when the gripping portion is not gripping an item; and means for determining the completion of a receiving motion that determines the completion of an item-receiving motion on the basis of at least one of an external force detected by the external force detecting means and an opening-degree detected by the opening-degree detecting means, during the receiving motion.

When passing an item to the robot, the human presses it against the gripping portion of the robot in a grippable manner. The external force detecting means detects the external force caused by the item, and the means for determining to start receiving an item determines, on the basis of the force level, to start and starts the receiving motion.

On judging that "the robot has received the item", the human releases it, thus decreasing the external force to be detected by the external force detecting means. The system for carrying an item uses the decrease in the force to determine whether or not the robot has completed its receiving motion.

The system also determines the robot has completed its receiving motion when the opening degree of the gripping portion has decreased to an extent exceeding a predetermined amount.

Being capable of determining whether or not it is possible to start the receiving motion, and of recognizing the completion of the motion, the system can perform the receiving motion without giving the human a sense of discomfort.

According to item 2 of the present invention, there is provided an item-carrying system as set forth in item 1, wherein the means for determining the completion of a receiving motion determines that the receiving motion has completed if the external force is not more than a second predetermined value.

Thus, setting the second predetermined value for the external force and using the value to determine the completion of the receiving motion facilitates determining the completion of the receiving motion.

According to item 3 of the present invention, there is provided an item-carrying system as set forth in item 1, wherein the means for determining the completion of a receiving motion determines that the receiving motion has completed if the opening degree is not more than a third predetermined value.

Thus, setting the third predetermined value for the opening degree and using the value to determine the completion of the receiving motion facilitates determining the completion of the receiving motion.

According to item 4 of the present invention, there is provided an item-carrying system as set forth in item 1, wherein the receiving/passing motion deciding means causes the gripping portion to generate a gripping force if the means for determining the completion of a receiving motion has determined that the receiving motion has completed.

Thus, by gripping the item after the completion of the receiving motion, the robot avoids giving the human a sense of discomfort such as forcibly snatching the item therefrom.

According to item 5 of the present invention, there is provided an item-carrying system as set forth in item 4, wherein the system further comprises means for determining success/failure in gripping an item after the receiving/passing motion deciding means caused the gripping portion to generate a gripping force.

This construction allows determining whether or not the gripping portion has successfully gripped the item.

According to item 6 of the present invention, there is provided an item-carrying system as set forth in item 5, wherein the means for determining success/failure in gripping an item determines the success/failure of the gripping motion if the opening degree is not more than a fourth predetermined value.

To prevent failing in gripping a thin item, the robot can determine success/failure in gripping the item, only when the opening degree is not more than the fourth predetermined value. This permits omitting to determine the success/failure when the item is thick.

According to item 7 of the present invention, there is provided an item-carrying system as set forth in item 5, wherein the receiving/passing motion deciding means reperforms the receiving motion if the means for determining success/failure in gripping an item has determined that the gripping motion is failed.

This allows the robot to re-receive the item when failing to grip the item.

According to item 8 of the present invention, there is provided an item-carrying system as set forth in item 5, wherein the robot comprises a pair of gripping portions for gripping an item.

According to item 9 of the present invention, there is provided an item-carrying system as set forth in item 8, wherein the means for determining success/failure in gripping an item determines success/failure of the gripping motion on the basis of an external force generated from the item when the pair of gripping portions are moved closer or apart.

This permits the robot to determine whether or not both of the gripping portions are gripping the item.

According to item 10 of the present invention, there is provided an item-carrying system as set forth in item 9, wherein the means for determining success/failure in gripping an item determines the gripping motion as success or failure, if the external force is not less than or less than a fifth predetermined value, respectively, the external force being generated from the item when the pair of gripping portions are moved closer or apart and detected by the external force detecting means.

According to item 11 of the present invention, there is provided an item-carrying system as set forth in item 1, wherein the gripping portion comprises:

a palm portion;

a first finger attached to the palm portion via a first joint; and a second finger attached to the palm portion via a second joint, the gripping portion gripping an item with the first and the second fingers, and wherein the opening-degree detecting means comprises:

first finger angle detecting means for detecting a first finger angle between the palm and the first finger; and second finger angle detecting means for detecting a second finger angle between the palm and the second finger.

This allows detecting the opening degree with a simple construction.

According to item 12 of the present invention, there is provided an item-carrying system as set forth in item 1, wherein the external force detecting means can detect a horizontally directed external force, and wherein the receiving/passing motion deciding means uses a horizontally directed external force applied to the gripping portion as an external force from the item.

This eliminates an effect of the external force due to the self-weight of the item, and allows detecting and using in a preferable manner an external force due to receiving/passing an item from/to the human.

According to item 13 of the present invention, there is provided an item-carrying system as set forth in item 12, wherein the external force detecting means is a six-axis force sensor.

This permits a simple construction to detect the horizontally directed external force.

According to item 14 of the present invention, there is provided an item-carrying system as set forth in item 1, wherein the system further comprises: human-position specifying means for specifying the position of a human; and receiving/passing position deciding means for deciding, on the basis of the specified human-position, the position for the robot to receive/pass an item from/to the human, and then moving the robot to the receiving/passing position.

The robot thus moves to a preferred position for the receiving/passing motion, thereby alleviating the load for the human in receiving/passing the item.

According to item 15 of the present invention, there is provided an item-carrying system as set forth in item 1, wherein the system further comprises: body-height specifying means for specifying the body-height of the human; and receiving/passing height deciding means for deciding, on the basis of the specified human-body height, the height for the robot to receive/pass an item from/to the human, and then moving the gripping portion to the receiving/passing height.

The robot thus holds the gripping portion to a preferred height for the human to receive/pass the item, thereby ridding the human of the load therefor.

According to item 16 of the present invention, there is provided an item-carrying system as set forth in item 1, wherein the system comprises human-specifying means for specifying the human to whom to pass the item, on the basis of a task instruction signal.

This prevents the robot from erroneously recognizing the human who is to pass the item to the robot.

As discussed above, the present invention can provide the item-carrying system in which a robot can perform the item-receiving motion without giving the human a sense of discomfort when receiving it from the human.

BRIEF DESCRIPTION OF THE DRAWINGS

FIG. 7A is an illustrative view of a search area for an object sensing portion, presented in a top view.

FIG. 7B is an illustrative view of a search area for an object sensing portion, presented in a side view.

FIG. 20A is a drawing to show determination of success/failure in gripping an item, in which the gripping has succeeded.

FIG. 20B is a drawing to show determination of success/failure in gripping an item, in which the gripping has failed.

FIG. 20C is a drawing to show determination of success/failure in gripping an item, in which the gripping has failed.

DESCRIPTION OF THE PREFERRED EMBODIMENT

Figure 1:
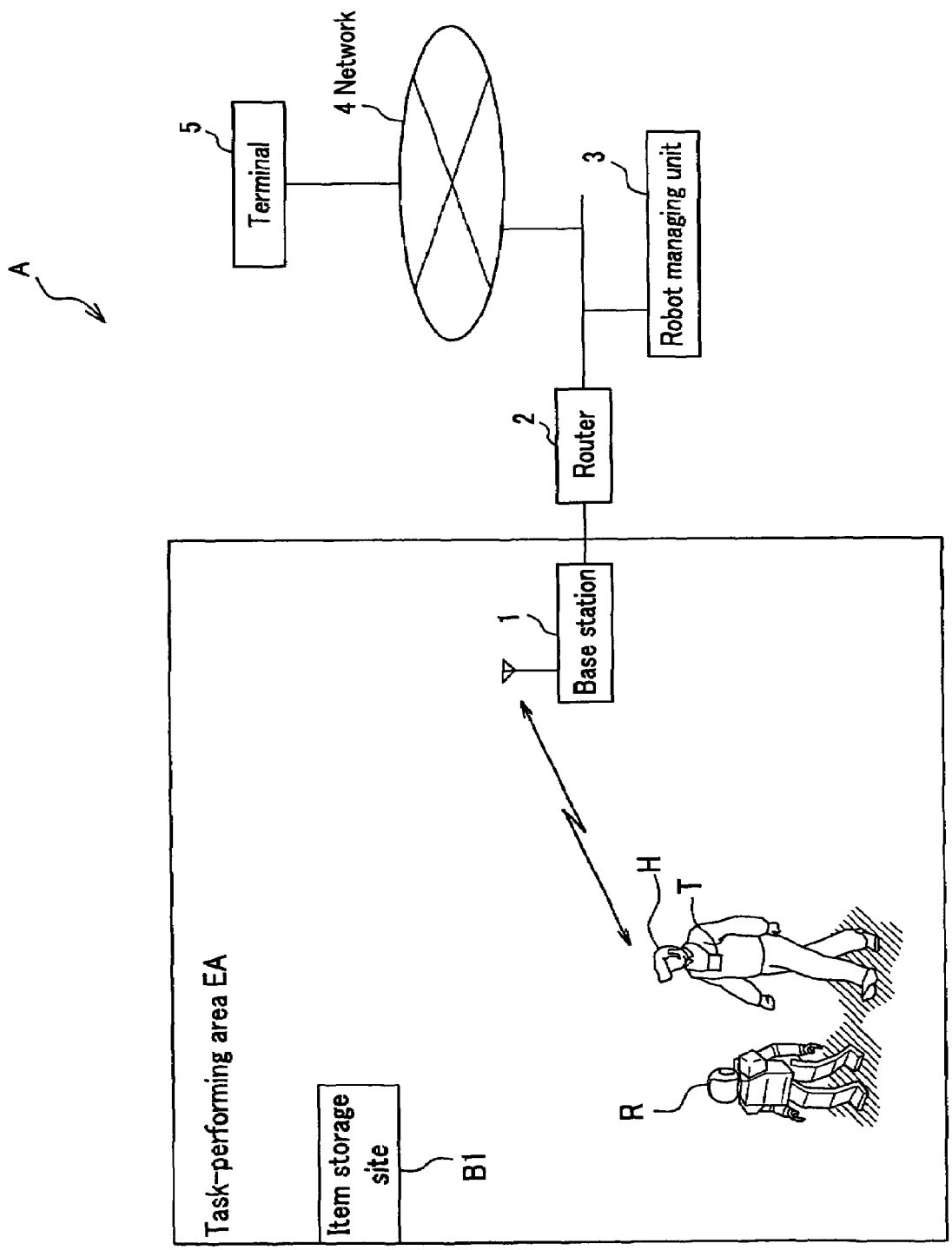
FIG. 1 is a system block diagram showing a robot control system according to an embodiment of the present invention.

Hereinafter, referring to the drawings accordingly, an embodiment of the present invention or an item-carrying system will be discussed, considering an office as a task-performing area and taking a robot control system adapted for item-carrying operation therein. In the drawings, the same portions are attached with the same symbol and a redundant explanation thereof will be omitted.

The "opening degree" as used herein is an index (value) to indicate an opening level of the gripping portion, such as the distance between the fingers of the gripping portion and the angle between a finger portion and a palm portion of the gripping portion.

<Construction of Robot Control System A>

First, a robot control system A according to an embodiment of the invention will be described. FIG. 1 is a system block diagram showing a robot control system according to an embodiment of the present invention.

As shown in FIG. 1, the robot control system A comprises: at least one robot R (one in this embodiment) placed in the task-performing area EA; a base station 1 (such as a wireless LAN) connected to the robot A via wireless communication; a robot managing unit 3 (such as a server) connected to the base station via a router 2; a terminal 5 connected to the robot managing unit 3 via a network 4; and a sensing tag T worn by a sensing object (a human).

The robot R is positioned in the task-performing area EA, in which the robot R autonomously moves to implement a task (carrying an item) on the basis of a task instruction signal. In the task-performing area EA is provided an item storage site B1, in which the robot R can place the item if, for example, the robot has failed to find the human who is to pass the item thereto.

To make the robot R operate a task based on task data to be input from the terminal 5 (to be described below), the robot managing unit 3 generates and outputs a task instruction signal including the task content to the robot R. The task data pertains to the task for the robot R to operate, which contains, for example, the human who is to pass the item to the robot R, the human to whom the robot R is to pass the item, and type of item for carriage.

The terminal 5 is an input device, such as a desk-top computer and a PHS from which to input the task data to the robot managing unit 3. The terminal 5 is also an output (display) device to enable the human to check a motion reporting signal (task completion reporting signal) sent from the robot R.

<Construction of Robot R>

Next, the robot R according to the present embodiment will be described. In the description, X, Y, and Z axes are provided in forward-backward, left-right, and up-down directions, respectively (see FIG. 2).

The robot R according to the embodiment is a dual-legged autonomous moving robot that implements a task based on the instruction signal sent from the robot managing unit 3.

Figure 2:
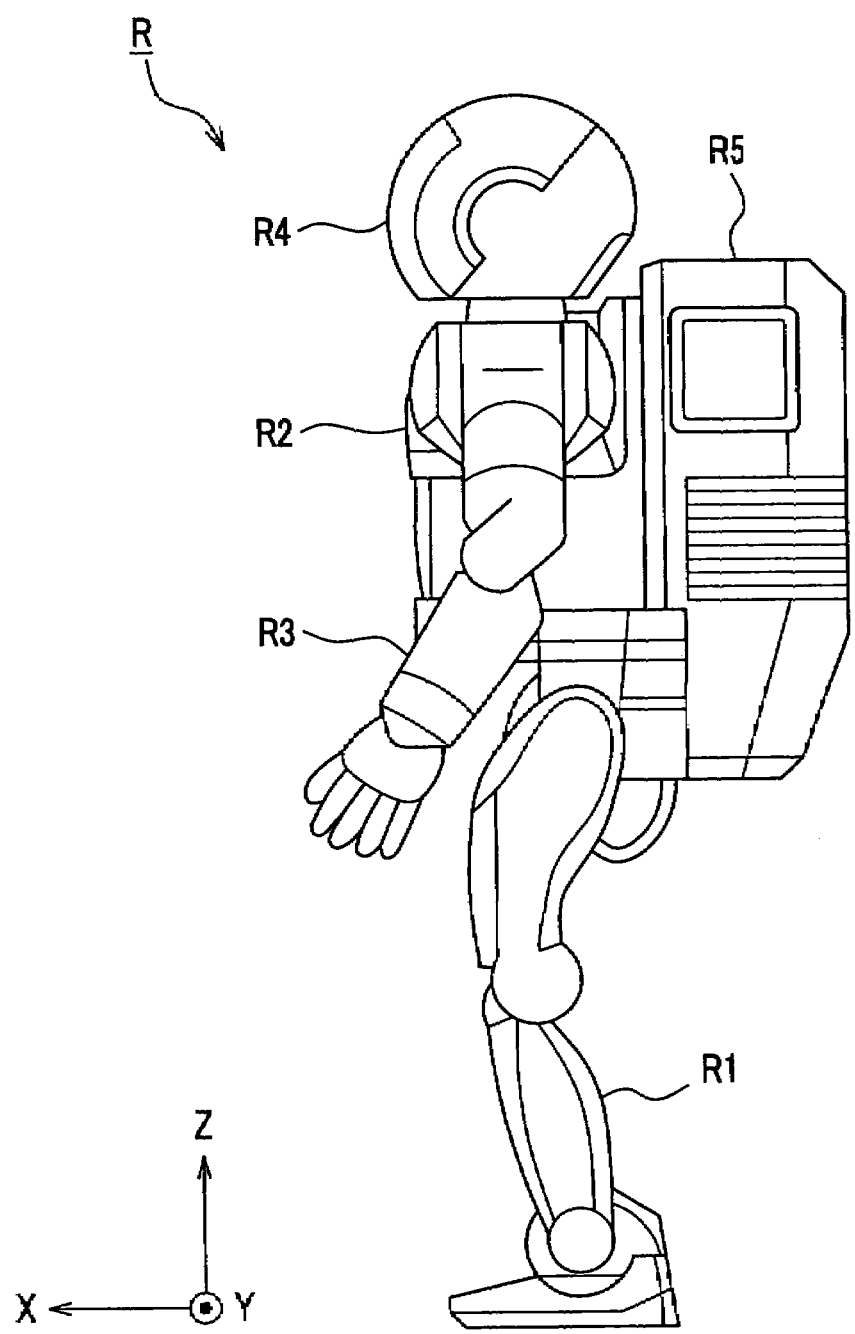
FIG. 2 is a side view showing an appearance of a robot in FIG. 1.

FIG. 2 is a side view showing an appearance of the robot in FIG. 1. As shown in FIG. 2, the robot R comprises a body R2, a head R4, two arms R3 (only one is shown) and two legs R1 (only one is shown) with which to stand up and autonomously move (e.g., walks and runs), like the human. The robot R also has on the back of the body R2 (in the form of carrying on the shoulders) a controller mounting portion R5 for controlling the operations of the legs R1, the body R2, the arms R3, and the head R4.

<Driving Structure of Robot R>

Figure 3:
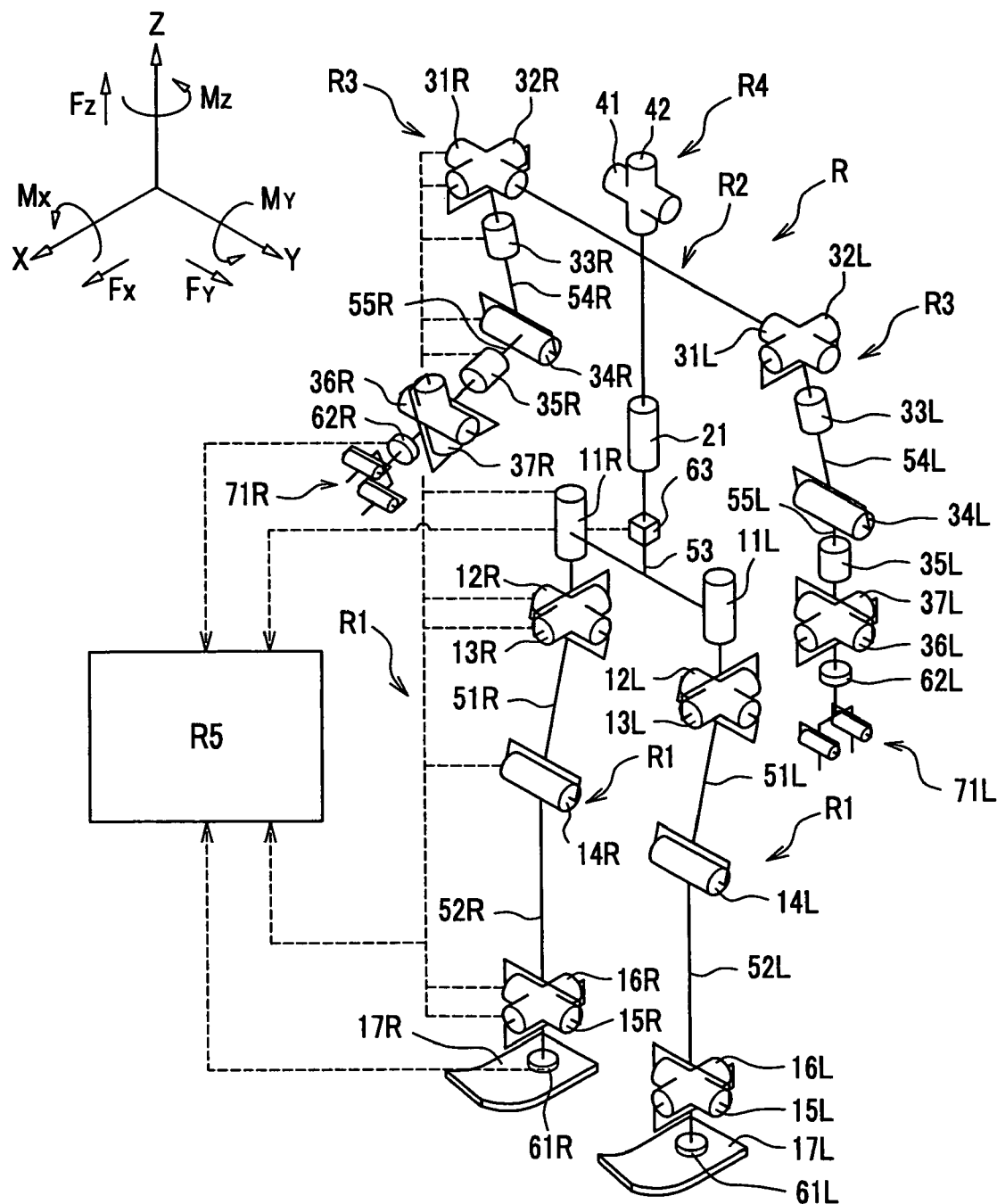
FIG. 3 is a perspective view showing in a simplified manner an internal structure of a robot in FIG. 1.

With reference to FIG. 3, a driving structure of the robot R will be described. FIG. 3 is a perspective view showing in a simplified manner a driving structure of the robot in FIG. 1. Joints as shown in FIG. 3 are illustrated as electric motors for driving the joints.

<Legs R1>

As shown in FIG. 3, the legs R1 each comprise six joints 11R (L)-16R (L), totaling in twelve joints in both right and left sides. These joints include: hip joints 11R, 11L for rotating (around the Z axis) the legs attached to the hip (connections between the legs R1 and the body R2); hip joints 12R, 12L around the pitch (Y) axis at the hip; hip joints 13R, 13L around the roll (X) axis at the hip; knee joints 14R, 14L around the pitch (Y) axis at the knee; ankle joints 15R, 15L around the pitch (Y) axis at the ankle; and ankle joints 16R, 16L around the roll (X) axis at the ankle. At the bottom of the legs R1, L1 are attached with feet 17R, 17L, respectively. Note that R and L indicate the right and left sides, respectively, and will be omitted in some cases hereinafter.

The legs R1 comprise: the hip joints 11R(L), 12R(L), 13R (L); the knee joint 14R(L); and the ankle joints 15R(L), 16R(L). The hip joints 11R(L)-13R(L) and the knee joint 14R(L) are connected via thigh links 51R, 51L, and the knee joints 14R(L) and the ankle joints 15R(L), 16R(L) via shank links 52R, 52L.

<Body R2>

As shown in FIG. 3, the body R2 has the legs R1, the arms R3, and the head R4 connected thereto. That is, the body R2 (body link 53) is connected to the legs R1, the arms R3, and the head R4 via the hip joints 11R(L)-13R(L), shoulder joints 31R(L)-33R(L) (to be described later), and neck joints 41, 42 (to be described later), respectively.

The body R2 also has a joint 21 for rotation thereof around the Z axis.

<Arms R3>

As shown in FIG. 3, the arms R3 in the right and left sides each comprise seven joints 31R(L)-37R(L), totaling in fourteen joints. These joints include: shoulder joints 31R, 31L around the pitch (Y) axis at the shoulders (connections between the arms R3 and the body R2); shoulder joints 32R, 32L around the roll (X) axis at the shoulders; shoulder joints 33R, 33L for rotating the arms (around the Z axis); elbow joints 34R, 34L around the pitch (Y) axis at elbows; arm joint 35R, 35L for rotating wrists (around the Z axis); wrist joints 36R, 36L around the pitch (Y) axis of the wrists; and wrist joints 37R, 37L around the roll (X) axis of the wrists. The arms R3 each have on their ends a gripping portion (hand) 71R, 71L, respectively, attached thereto.

That is, the arms R3 comprise: the shoulder joints 31R(L), 32R(L), 33R(L); the elbow joints 34R(L); the arm joint 35R (L); and the wrist joints 36R(L), 37R(L). The shoulder joints 31R(L)-33R(L) and the elbow joints 34R(L) are connected via an upper arm link 54R(L), and the elbow joints 34R(L) and the wrist joints 36R(L), 37R(L) via a forearm link 55R (L).

<Head R4>

The head 4 comprises: a neck joint 41 around the Y axis of the neck (connection between the head R4 and the body R2); and a neck joint 42 around the Z axis of the neck, as shown in FIG. 3. The neck joints 41 and 42 are provided for setting tilt and panning angles, respectively, of the head R4.

With this construction that provides the both legs R1 with a total of twelve freedoms of movement, the robot can arbitrarily move in a three-dimensional space by driving each of the twelve joints 11R(L)-16R(L) in an appropriate angle to allow a desired motion of the legs R1 when moving. Also, with the arms R3 provided with a total of fourteen freedoms of motion, the robot R can perform a desired operation by driving each of the fourteen joints 31R(L)-37R(L) in an appropriate angle.

Between the ankle joints 15R(L), 16R(L) and the feet 17R(L), a known six-axis force sensor 61R(L) is provided. The six-axis force sensor 61R(L) senses three directional components Fx, Fy, Fz and three directional components Mx, My, Mz of the moment of a reaction-force applied to the robot R from the floor surface.

Between the wrist joints 36R(L), 37R(L) and the gripping portions 71R(L), the known six-axis force sensor 62R(L) is provided. The known six-axis force sensor 62R(L) senses three directional components Fx, Fy, Fz and three directional components Mx, My, Mz of the moment of a reaction-force applied to the gripping portions 38R(L) of the robot R.

The body R2 has an inclination sensor 63 for sensing an inclination with respect to the gravitational (Z) axis of the body R2 and an angular velocity thereof.

The electric motors at the joints each cause a displacement to, for example, the thigh links 51R(L) and the shank links 52R(L), via a deaccelerator (not shown) for decreasing and increasing the power of the motor. Each angle of the joints is detected by a joint angle detecting means (e.g., a rotary encoder).

The controller mounting portion R5 includes: an autonomous movement controlling section 150 (to be discussed later); a gripping portion controlling portion 160; a wireless communication portion 170; a main controlling portion 200; and a battery (not shown). Detection data from the sensors 61-63 is sent to the controlling sections in the controller mounting portion R5. The controlling sections each send a drive instruction signal to drive the electric motor.

Figure 4:
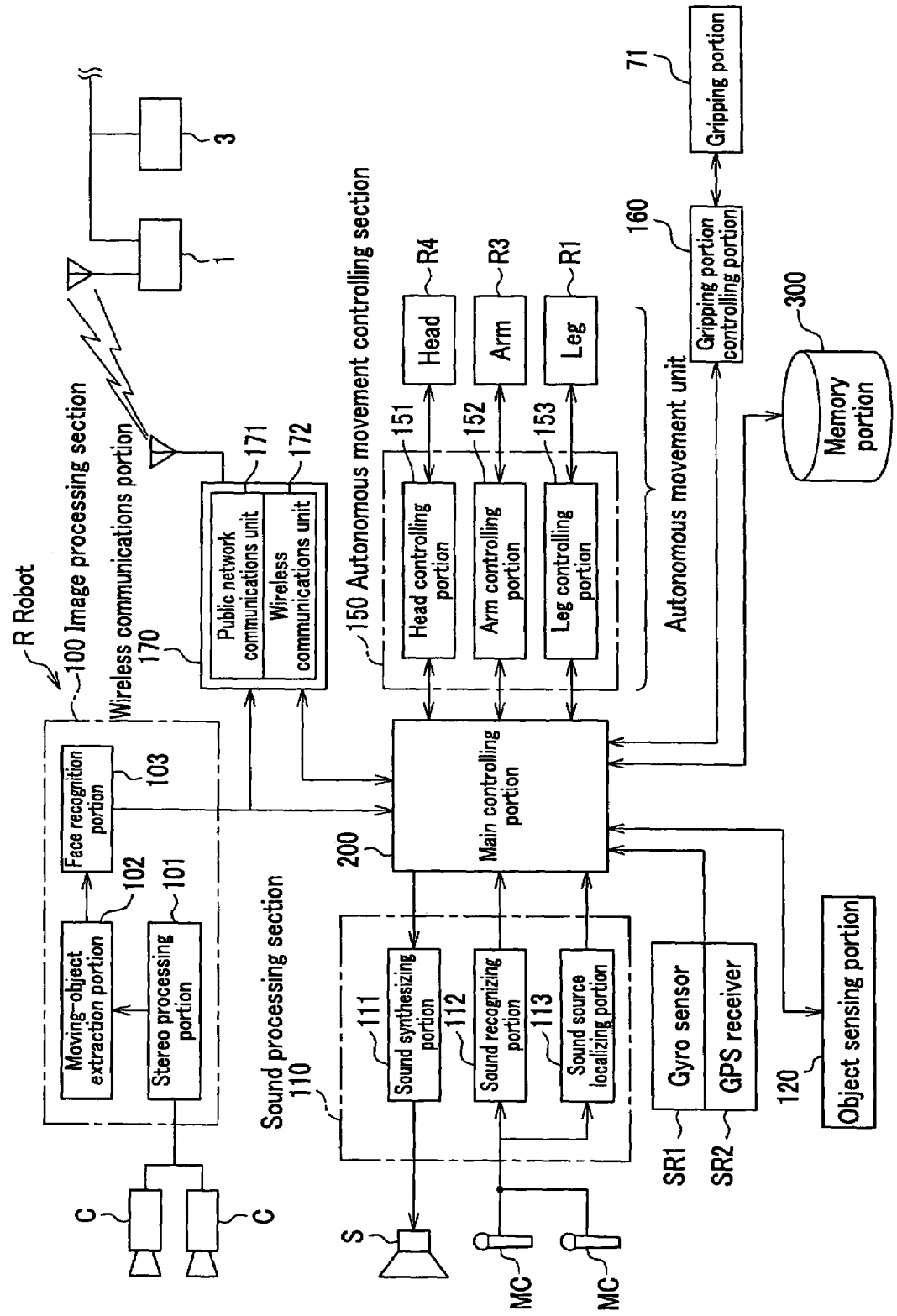
FIG. 4 is a block diagram showing a robot in FIG. 1.

FIG. 4 is a block diagram showing the robot in FIG. 1. In addition to the legs R1, the arms R3, and the head R4, the robot R comprises: cameras C, C; a speaker S; microphones MC, MC; an image processing section 100; a sound processing section 110; an object sensing portion 120; the autonomous movement controlling section 150; the gripping portion controlling portion 160; the wireless communication portion 170; the main controlling portion 200; and a memory portion 300, as shown in FIG. 4.

The robot R also comprises a gyro-sensor SR1 and a GPS receiver SR2 which detect data pertaining to the direction (direction data) and the position (position data) of the robot R, respectively. The data detected by the gyro-sensor SR1 and the GPS receiver SR2 is output to the main controlling portion 200 for use to determine the motion of the robot R, and then sent to the robot managing unit 3 from the main controlling portion 200 via the wireless communication portion 200.

<Cameras>

The cameras C, C, e.g., color CCD (Charge-Coupled Device) cameras, can each capture an image as digital data. The cameras C, C are arranged side by side in parallel and each take an image which is output to the image processing section 100. The cameras C, C, the speaker S, and the microphones MC, MC are all mounted in the head R4.

<Image Processing Section>

The image processing section 100 is a portion for processing an image taken by the cameras C, C to grasp therefrom the situation around the robot so as to recognize an obstacle or a human around the robot R. The image processing section 100 comprises a stereo processing portion 101, a moving-object extraction portion 102, and a face recognition portion 103.

The stereo processing portion 101 conducts the steps of performing pattern-matching between the images taken by both sides of the cameras C, C using one of the images as a reference image; generating a parallax image by calculating parallax between corresponding pixels in the images; and outputting the generated parallax and original images to the moving-object extraction portion 102. This parallax represents the distance from the robot R to the pictured object.

The moving-object extraction portion 102 extracts a moving object in the pictured image based on the data output from the stereo processing portion 101. The moving object is extracted for the purpose of recognizing a human, with the assumption that any moving object is a human.

In order to extract a moving object, the moving-object extraction portion 102 has several past frames stored therein with which latest frames (images) are compared to perform pattern-matching, calculate a moving amount for each pixel, and generate an image representing the amount of movement. When there exists in the parallax and moving amount images any pixel with a large moving amount in a predetermined distance range from the cameras C, C, the extraction portion 102 assumes a human exists at that position, extracts the moving object as a parallax image dedicated for the predetermined range, and then outputs an image of the object to the face recognition portion 103.

The moving-object extraction portion 102 also calculates and outputs the height of the extracted object or the body height to the face recognition portion 103.

That is, the moving-object extraction portion 102, as an example of human-position specifying means as described in the claims, can specify the position of the human with respect to the robot R.

Also, the moving-object extraction portion 102, as an example of body-height specifying means as described in the claims, can calculate the human body height.

The face recognition portion 103 extracts a portion with a skin color from the extracted moving object to recognize the face position from, for example, the size and shape thereof.

Similarly, the hand position is also recognized on the basis of, for example, the area, size, and shape of the skin color portion.

The face position recognized is output to the main controlling portion 200 as well as to the wireless communication portion 170 to be sent to the robot managing unit 3 via base station 1, as information for the robot R to move and communicate with the human.

<Speaker>

The speaker S outputs a sound on the basis of sound data created by a sound synthesizing portion 111 (to be discussed later).

<Microphones>

The microphones MC, MC collect sound around the robot R. The collected sound is output to a sound recognizing portion 112 and a sound source localizing portion 113 (to be discussed later).

<Sound Processing Section>

The sound processing section 110 includes the sound synthesizing portion 111, the sound recognizing portion 112, and the sound source localizing portion 113.

The sound synthesizing portion 111 creates a sound data from character information on the basis of a speech behavior instruction determined and output by the main controlling portion 200, and outputs the sound to the speaker S. The sound data is created by using a correspondence relationship between prestored character information and sound data.

The sound recognizing portion 112 receives sound data input from the microphones MC, MC, and creates and outputs to the main controlling portion 200, character information from the sound data on the basis of a prestored correspondence relationship between sound data and character information.

The sound source localizing portion 113 specifies the position of the sound source (the distance and direction from the robot R) on the basis of the differences in sound pressure and time-of-arrival of sound between the microphones MC, MC.

<Object Sensing Portion>

Figure 5:
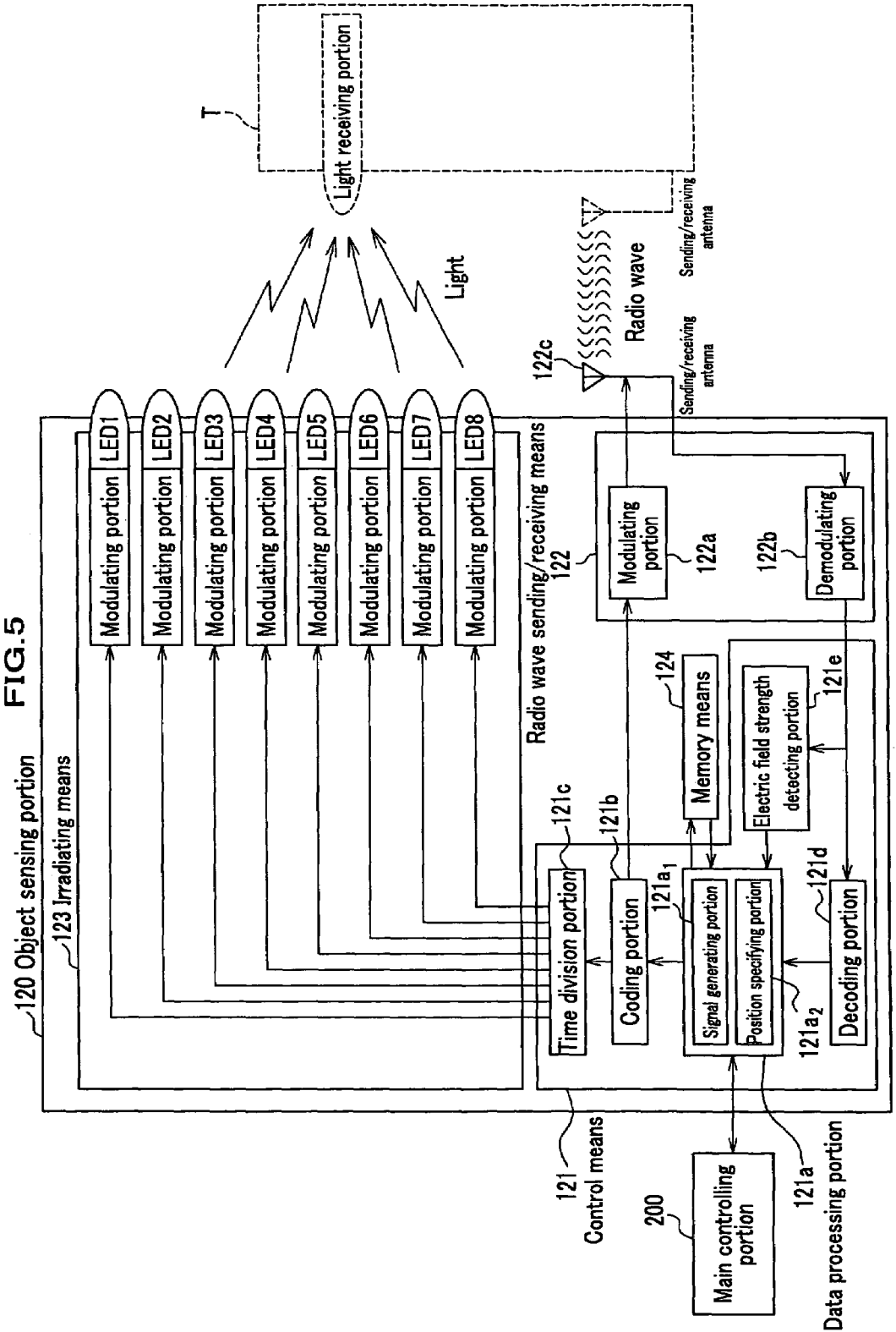
FIG. 5 is a block diagram showing an object sensing portion in FIG. 4.
Figure 6:
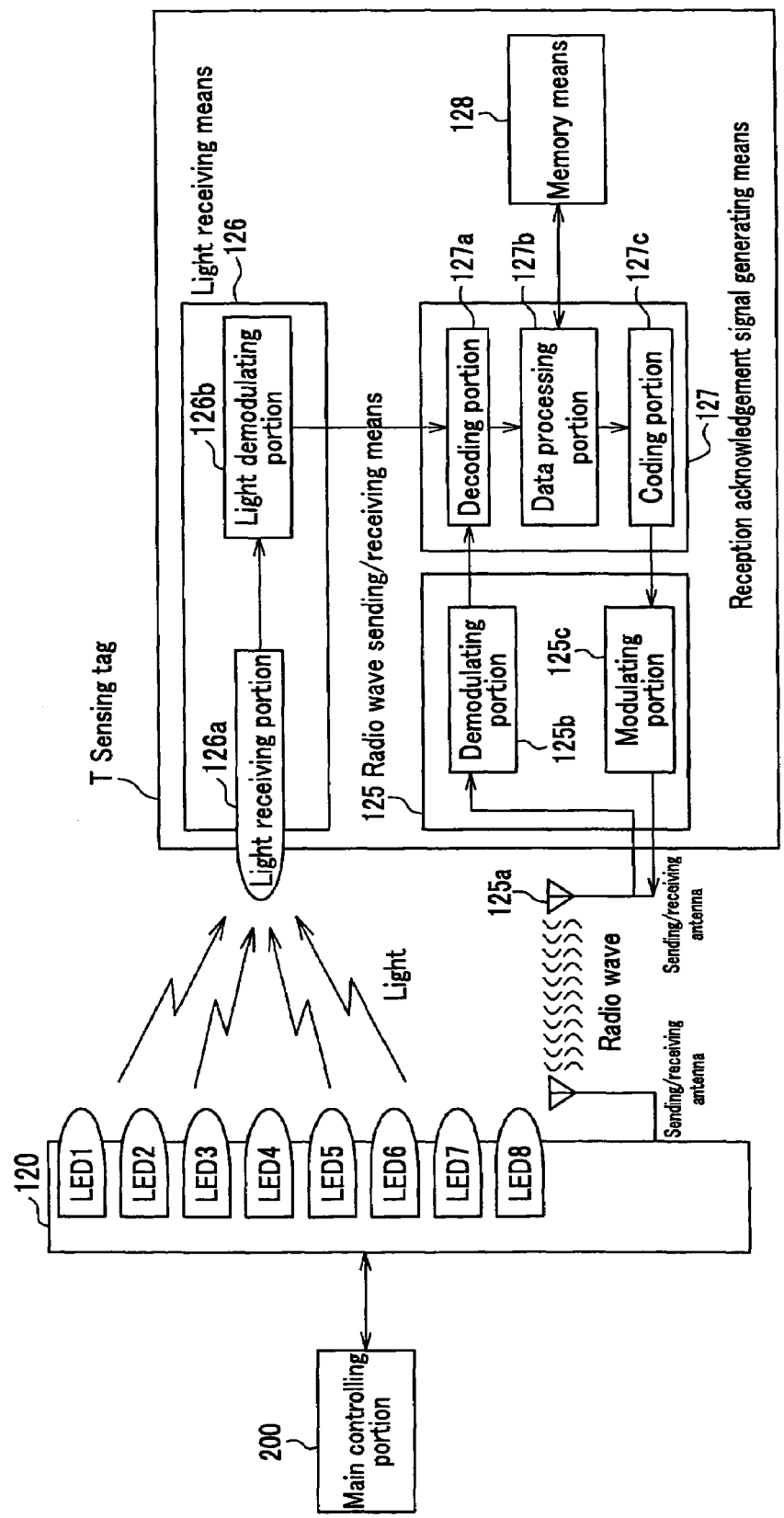
FIG. 6 is a block diagram showing a sensing tag in FIG. 1.
Figure 8:
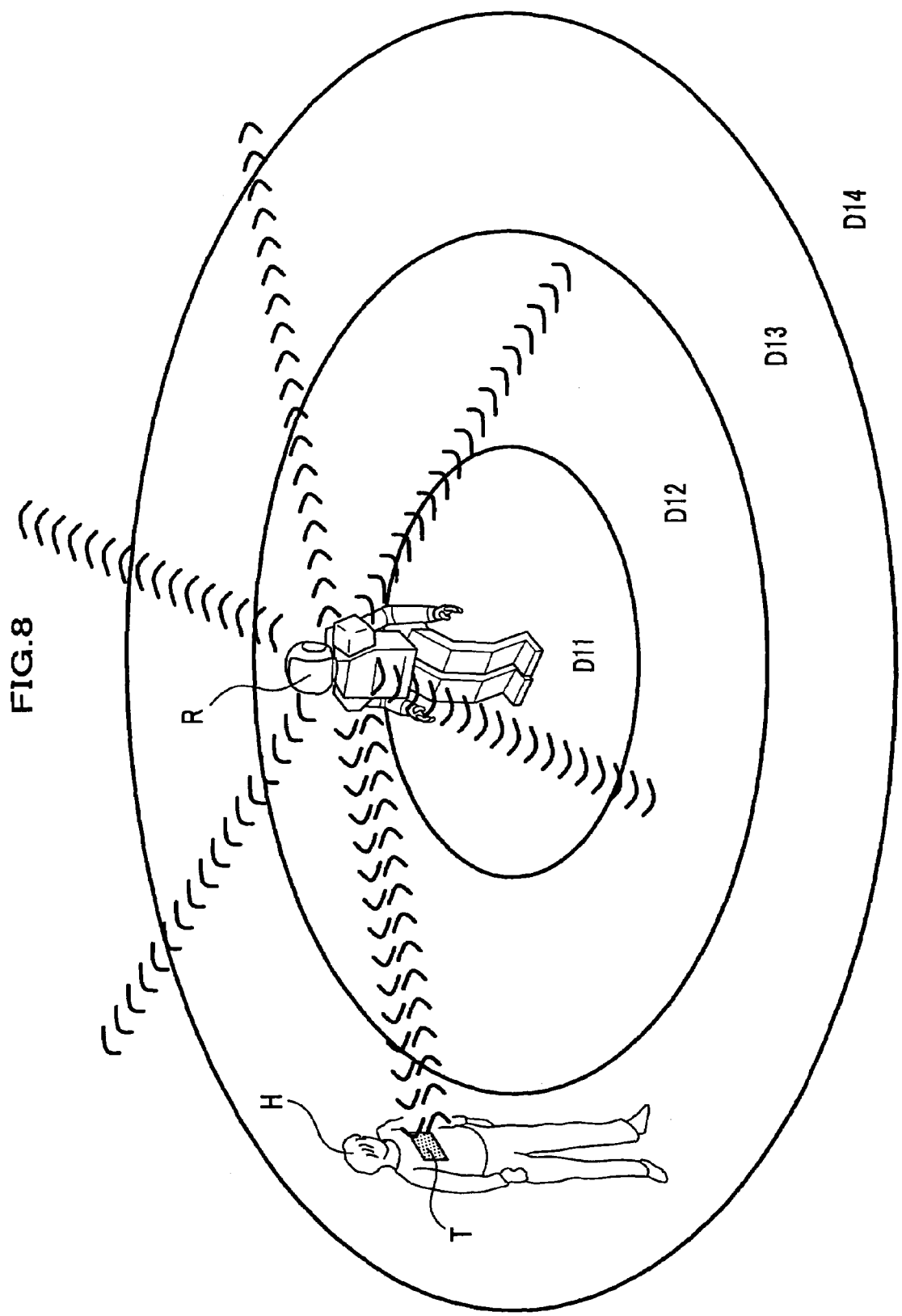
FIG. 8 is an illustrative view of partitioning of areas around the robot by an object sensing portion.

Next, with reference to FIGS. 5-8, the object sensing portion 120 shown in FIG. 4 and the sensing tag T will be discussed. FIG. 5 is a block diagram showing the object sensing portion in FIG. 4. FIG. 6 is a block diagram showing the sensing tag in FIG. 1. FIGS. 7A and 7B are illustrative views of a search area for the object sensing portion, presented in top and side views, respectively. FIG. 8 is an illustrative view of partitioning of areas around the robot by the object sensing portion.

The object sensing portion 120 senses whether or not a sensing object H wearing the sensing tag T exists around the robot R, and if so, specifies the position of the object H.

As shown in FIG. 5, the object sensing portion 120 comprises a control means 121, a radio wave sending/receiving means 122, an irradiating means 123, and a memory means 124.

The control means 121 creates a search signal to be wirelessly sent from the radio wave sending/receiving means 122 (to be discussed later), and a direction checking signal to be output from the irradiating means 123 (to be discussed later) as infrared light, as well as specifies the position of the sensing object H on the basis of a reception acknowledgement signal sent from the sensing tag T that has received the search signal.

Here, it is to be noted that: the search signal is used to sense whether or not the sensing object H exists around the robot R; the direction checking signal to sense to which direction the sensing object H will move with the robot R provided as a reference; and the reception acknowledgement signal to indicate that the sensing tag T has received at least the search signal.

The control means 121 comprises a data processing portion 121a, a coding portion 121b, a time division portion 121c, a decoding portion 121d, and an electric field strength detecting portion 121e.

The data processing portion 121a creates a search signal and a direction checking signal, specifies the position of the sensing object H, and comprises a signal generating portion $121a_1$ and a position specifying portion $121a_2$.

The signal generating portion 121a1 refers to the memory portion 124 at every predetermined time period or at every input of a signal (transmission instruction signal) instructing a transmission of an electric signal from the main controlling portion 200, to obtain an identification number (hereinafter referred to as a robot ID) unique to the robot R in which is provided the object sensing portion 120.

The signal generating portion $121a_1$ produces a search signal including the robot ID and a reception acknowledgement request signal.

Here, it is to be noted that the reception acknowledgement request signal is for requesting the sensing object H (sensing tag T) that has received the search signal to generate a signal indicating the reception of the search signal (reception acknowledgement signal).

Further, when generating this search signal, the signal generating portion $121a_1$ also generates a direction checking signal to be irradiated from the irradiating means 123 (to be discussed later) as an infrared signal.

The direction checking signal is individually generated for all of the irradiating portions (LED1-LED8) provided to the irradiating means 123, and includes the robot ID and an identifier to specify each of the irradiating portions (Irradiating Portion ID).

The direction checking signal is also generated when the reception acknowledgement signal input from the decoding portion 121d (to be described later) includes an irradiation request signal.

In the present embodiment employing a total of eight irradiating portions, the data processing portion 121a generates a total of eight direction checking signals each including the robot ID and the irradiating portion ID.

For example, when the robot ID is "02" and the irradiating portions (LED1-LED8) respectively have the irradiating portion IDs (L1-L8), the direction checking signals to be generated for the irradiating portions LED1 and LED2, respectively, include a robot ID="02" and an irradiating portion ID="L1", and a robot ID="02" and an irradiating portion ID="L2", respectively.

The signal producing portion $121a_1$ outputs the direction checking signal and the search signal to the coding portion.

The position specifying portion $121a_2$ specifies the position of the sensing object H on the basis of the reception acknowledgement signal sent from the sensing tag T that has received the search signal. The processes to be conducted at this time in the position specifying portion $121a_2$ will be discussed in detail later together with those processes in decoding portion 121d and the electric field strength detecting portion 121e.

The coding portion 121b codes and then outputs a signal that was input thereto, i.e., outputs a search signal obtained by coding (a coded search signal) to the radio wave sending/receiving means 122 (to be described below).

With this, the coded search signal is modulated and then wirelessly sent from the radio wave sending/receiving means 122.

The coding portion 121b similarly codes the direction checking signal that was input from the data processing portion 121a, and then outputs the coded direction checking signal thus obtained to the time division portion 121c (to be discussed below).

In this embodiment, one direction checking signal is generated in the data processing portion 121a for each irradiating portion of the irradiating means 123.

The irradiating means 123 is provided with a total of eight irradiating portions as shown in FIG. 5, and therefore, a total of eight direction checking signals are input to the coding portion 121b from the data processing portion 121a.

As a result, a total of eight coded direction checking signals are generated in the coding portion 121b and output to the time division portion 121c.

The time division portion 121c sets the irradiation order and timing for the irradiating portions (LED1-LED8) of the irradiating means 123.

Specifically, on input of the coded direction checking signal from the coding portion 121b, the time division portion 121c sets the irradiation order and timing for the irradiating portions (LED1-LED8), and then outputs the coded direction checking signal to the irradiating means 123 according to the determined order and timings.

For example, in order to flash the irradiating portions at an time interval of 0.5 second in the order of LEDs 1, 4, 7, 2, 5, 8, 3 and 6, the time division portion 83 outputs the coded direction checking signal to modulating portions of the LEDs 1, 4, 7, 2, 5, 8, 3 and 6 in this order at an time interval of 0.5 second.

In the present embodiment, a total of eight coded direction checking signals are input to the time division portion 121c. The coded direction checking signals are each predetermined in the data processing portion 121a in terms of to which irradiating portion to be output.

Thus, on receiving inputs of the coded direction checking signals, the time division portion 121c checks each of the irradiating portion IDs contained in the signals, and then outputs the signals in a predetermined order and timing to modulating portions adjacent to the irradiating portions specified by the irradiating portion IDs.

For example, when the irradiating portions (LED1-LED8) have IDs specified as "L1-L8", the time division portion 121c outputs the coded direction checking signals respectively having the irradiating portion IDs "L1" and "L2" to the modulating portions adjacent to the irradiating portions LED1 and LED2, respectively.

The irradiating means 123 irradiates light to a search area preset around the robot R.

The irradiating means 123 comprises the plurality of irradiating portions LED1-LED8 and the modulating portions provided corresponding to the irradiating portions.

The modulating portions modulate with a predetermined modulation method the coded direction checking signals input from the time division portion 121c into modulated signals.

The irradiating portions irradiate the modulated signals to the predetermined search area as infrared signals (lights).

In the present embodiment, in order to specify the position of the sensing object H, the area around the robot R is partitioned into a plurality of search areas (see FIG. 7A). For each search area, one LED is provided an as an irradiating portion for irradiating an infrared light thereto.

Specifically, in the example shown in FIG. 7A, a total of eight search area D1-D8 are set in the whole circumference or 360 degrees around the robot R.

In other words, a plurality of search areas D1-D8 each with an approximate sector shape are provided around and encircling the robot R. The robot R is located approximately at the center area surrounded by the sector areas.

Thus, in an example shown in FIG. 7, in order to allow irradiation of an infrared light to each search area, the robot R has in the head R3 a total of eight irradiating portions along the periphery of the head R3, each directed to a corresponding search area.

Also, as shown in FIG. 7A, the search areas D1-D3 in the front side of the robot R are made narrower than the other search areas D4-D8.

Thus, the search area D1-D8 are provided in order to solve the problem that the sensing object H may think the lines of vision of the robot R are not directed thereto, if a deviation occurs between the front of the face of the robot R (referred to as the direction of the lines of vision) and the position of the sensing object H when the robot R senses the sensing object H and directs its face thereto.

Here, a method for eliminating the problem is to increase the number of the search areas, but only on the front side rather than the whole circumference of the robot R, to allow finely specifying a position on the front side, so that the lines of vision of the robot R can be directed to the position of the sensing object H. This construction can also decrease the number of the irradiating portions.

Thus in the present embodiment, by narrowing the irradiation scope of the infrared light in the search area D1-D3 on the front side of the robot R, it is made possible to more accurately specify the position of the sensing object H in the search areas D1-D3.

This allows, when the sensing object H is a human and the cameras C, C take an image of the face, more accurately specifying the position of the sensing object H on the front side of the robot R, and reflecting the result on the movement control of the robot R and image angle adjustment. As a result, the cameras C, C can be precisely directed to the face of the sensing object H.

As shown in FIG. 5, the radio wave sending/receiving means 122 sends a radio wave to the areas around the robot R, as well as receives the reception acknowledgement signal sent from the sensing object H that has received the radio wave.

The radio wave sending/receiving means 122 comprises a modulating portion 122a, a demodulating portion 122b, and a sending/receiving antenna 122c.

The modulating portion 122a modulates with a predetermined modulation method the search signal (actually, the coded search signal) input from the data processing portion 121a into a modulated signal, and then wirelessly sends this signal via the sending/receiving antenna 122c.

The demodulating portion 122b receives, via the sending/receiving antenna 122c, the modulated signal wirelessly sent from the sensing tag T of the sensing object H, and demodulates the received signal to obtain the reception acknowledgement signal (actually, a coded reception acknowledgement signal).

The demodulating portion 122b then outputs the obtained reception acknowledgement signal to the decoding portion 121 and the electric field strength detecting portion 121d.

The decoding portion 121d decodes the coded reception acknowledgement signal to obtain the reception acknowledgement signal, and outputs the obtained signal to the data processing portion 121a.

In the present embodiment, the reception acknowledgement signal includes at least the irradiating portion ID, the robot ID, and a tag ID number (as will be discussed in detail later), which are output to the data processing portion 121a by the decoding portion 121d.

The irradiation request signal included in the reception acknowledgement signal is also output to the data processing portion 121a.

The electric field strength detecting portion 121e is for obtaining the strength of the modulated signal sent from the sensing tag T of the sensing object H, which is received by the radio wave sending/receiving means 122.

Specifically, the electric field strength detecting portion 121e detects the electric power of the reception acknowledgement signal input from the demodulating portion 122b, obtains an average value of the power as the electric field strength, and then outputs the strength to the data processing portion 121a.

The position specifying portion $121a_2$ of the data processing portion 121a is for specifying the position of the sensing object H.

Specifically, the position specifying portion $121a_2$ obtains the direction from the robot R to the sensing object H on the basis of the electric field strength of the modulated signal, when the radio wave sending/receiving means 122 receives the modulated signal sent from the sensing tag T. The position specifying portion $121a_2$ further refers to the irradiating portion ID contained in the reception acknowledgement signal to specify from which irradiating portion the light received by the sensing target H was irradiated, and regards the specified irradiation direction of the irradiating portion, i.e., the direction of the search area corresponding to the irradiating portion, as the direction in which the sensing target H exists, so as to specify the position of the sensing object H.

In this embodiment, the position specifying portion $121a_2$ first obtains a robot ID out of the reception acknowledgement signal that was input from the decoding portion 121d and compares the robot ID with a robot ID stored in the memory means 124. If both the IDs match, then the position specifying portion $121a_2$ begins specifying the position of the sensing target H.

In the embodiment, the surrounding area of the robot R is partitioned to four areas depending on the distance from the robot R, i.e., defined as areas D11, D12, D13, and D14 in the order of shorter distance from the robot, as shown in FIG. 8.

Each of these areas and the electric field strength are associated to each other in advance based on the magnitude of the strength, and a table (distance table) indicating the associations is stored in the memory means 124.

The position specifying portion $121a_2$ thus refers to the distance table on the basis of the electric field strength input from the electric field strength detecting portion 124, to obtain (area) information indicating in which area the sensing object H that sent the reception acknowledgement signal is present.

For example, the position specifying portion $121a_2$ obtains (area) information that indicates the area D13, if the electric field strength input thereto from the electric field strength detecting portion 121e falls between the threshold values defining the area D13.

Further, the position specifying portion $121a_2$ refers to the irradiating portion ID contained in the reception acknowledgement signal input from the decoding portion 121d, to specify from which irradiating portion in the irradiating means 123 was the light irradiated that was received by the sensing object H that had sent the reception acknowledgement signal, so as to obtain (direction) information indicating the irradiation direction of the specified irradiating portion.

In the present embodiment, in the surrounding area of the robot R, a total of eight searching areas D1-D8 are set around the robot R, as shown in FIG. 7A.

In the memory means 124 is stored a (direction) table indicating to which search area the irradiating portions are each directed.

Thus, the data processing portion 121a uses the irradiating portion ID to refer to the direction table stored in the memory means 124, to check to which of the predetermined search areas D1-D8 the infrared light is irradiated which is radiated from the irradiating portion with the irradiating portion ID. The data processing portion 121a then obtains information indicating the confirmed search area as (direction) information indicating the direction in which the sensing object H exists.

The position specifying portion $121a_2$ generates (position) information indicating the position of the sensing object H from the obtained area information and direction information.

As a result, the positional relationship between the robot R and the sensing object H is specified from the strength of the reception acknowledgement signal received by the robot R and the irradiating portion ID contained in the reception acknowledgement signal. In other words, the direction and the distance from the sensing object H in which the robot R exists, i.e., the position of the sensing object H, are specified.

The position specifying portion $121a_2$ outputs the position information to the main controlling portion 200 along with the tag ID number contained in the reception acknowledgement signal input from the decoding portion 121d.

This allows the main controlling portion 200 to control the autonomous movement controlling section 150 to move the robot R to the front of the sensing subject H, and if the sensing subject H is a human, to correct the elevation angle and direction of the cameras C, C to take an image of the face of the sensing subject H.

When the reception acknowledgement signal contains the irradiation request signal, the signal producing portion $121a_1$ generates and outputs the direction checking signal to the coding portion 121b. This causes the irradiating portions of the irradiating means 123 to radiate infrared light.

<Sensing Tag>

The sensing tag T is for receiving the radio wave sent and light irradiated from the robot R and sending thereto the reception acknowledgement signal for acknowledging the reception of the wave and light.

The radio wave sent and the light irradiated from the robot R are received by the sensing tag T worn by the sensing object H which is a human in this embodiment. The sensing tag T is described below.

As shown in FIG. 6, the sensing tag T comprises a radio wave sending/receiving means 125, a light receiving means 126, a reception acknowledgement signal generating means 127, and a memory means 128.

The radio wave sending/receiving means 125 is for receiving the modulated signal wirelessly sent from the robot R, as well as modulating and then sending to the robot R the reception acknowledgement signal generated by the reception acknowledgement signal generating means 127 (to be discussed later).

The radio wave sending/receiving means 125 comprises a sending/receiving antenna 125a, a demodulating portion 125b, and a modulating portion 125c.

The demodulating portion 125b is for demodulating the modulated signal sent from the robot R and received via the sending/receiving antenna 125a, obtaining the search signal (actually, a coded search signal), and outputting the search signal to the reception acknowledgement signal generating means 127 (to be described later).

The modulating portion 125c is for modulating the coded reception acknowledgement signal which was input from a coding portion 127c of the reception acknowledgement signal generating means 127 to generate a modulated signal, as well as for wirelessly sending the modulated signal via the sending/receiving antenna 125a.

The light receiving means 126 is for receiving the infrared light irradiated from the robot R.

The light receiving means 126 comprises a light receiving portion 126a and a light demodulating portion 126b.

The light receiving portion 126a directly receives the infrared light (signal) irradiated from the robot R.

The light demodulating portion 126b demodulates the infrared signal received by the light receiving portion to obtain the direction checking signal (actually, the coded direction checking signal).

Specifically, on receiving the infrared light irradiated from the robot R with the light receiving portion 126a, the light receiving means 126 demodulates the received infrared signal with the light demodulating portion 126b to obtain the coded direction checking signal, and then outputs the signal to the reception acknowledgement signal generating means 127.

When the radio wave sending/receiving means 125 has received a search signal sent from the robot R, the reception acknowledgement signal generating means 127 generates, according to the reception acknowledgement request signal contained in the signal, the reception acknowledgement signal for indicating the reception of the search signal sent from the robot R.

The reception acknowledgement signal generating means 127 comprises a decoding portion 127a, a data processing portion 127b, and a coding portion 127c.

The decoding portion 127a decodes a coded signal that was input thereto to obtain a signal.

The decoding portion 127a decodes the coded search signal input from the radio wave sending/receiving means 125 and the coded direction checking signal input from the light receiving means 126, to obtain the search signal and the direction checking signal. The decoding portion 127a then outputs the search and direction checking signals to the data processing portion 127b in the subsequent stage.

The data processing portion 127b is for generating the reception acknowledgement signal.

In the present embodiment, the search signal includes: the robot ID which is an identifier for specifying the robot R that has sent the search signal; and the reception acknowledgement request signal that instructs the sensing object H which has received the radio wave to conduct a predetermined process.

The direction checking signal contains: the robot ID which is an identifier for specifying the robot R that has sent the direction checking signal; and the irradiating portion ID for specifying the irradiating portion that has sent the direction checking signal.

Thus, on receiving an input of the search signal, the data processing portion 127b switches the light receiving means 126 from the wait to activated states according to the reception acknowledgement request signal contained in the search signal.

Then, if the direction checking signal is input to the light receiving means 126 within a predetermined time period after the activation thereof, the data processing portion 127b compares the robot IDs contained in the direction checking signal and the search signal.

If the IDs match, the data processing portion 127b refers to the memory means 128 to obtain a unique (tag) ID number assigned to the sensing tag T.

The data processing portion 127b then generates and outputs to the coding portion 127c, the reception acknowledgement signal that includes the tag ID number, the robot ID contained in the search signal, and the irradiating portion ID contained in the direction checking signal.

In contrast, if no direction checking signal is input to the light receiving means 126 within a predetermined time period after the activation thereof, or if the robot IDs contained in the search signal and the direction checking signal do not match, the data processing portion 127b generates and then outputs to the coding portion 127c, the reception acknowledgement signal that further contains the irradiation request signal.

Here, the irradiation request signal is a signal for instructing the robot R as a sensing unit to irradiate the infrared light.

The coding portion 127c codes and then outputs to the radio wave sending/receiving means 125, the reception acknowledgement signal input thereto into the coded reception acknowledgement signal.

By this procedure, the coded reception acknowledgement signal is modulated by the modulating portion 125c, and then wirelessly sent via the sending/receiving antenna 125a.

<Autonomous Movement Controlling Section>

As shown in FIG. 4, the autonomous movement controlling section 150 comprises a head controlling portion 151, an arm controlling portion 152, and a leg controlling portion 153.

The head controlling portion 151, the arm controlling portion 152, and the leg controlling portion 153 drive the head R4, the arms R3, and the legs R1, respectively, under the instruction by the main controlling portion 200. A combination of the autonomous movement controlling section 150, the head R4, the arms R3, and the legs R1 provides an example of the "autonomous movement means (autonomous movement unit)" as discussed in the claims.

<Gripping Portion Controlling Portion>

The gripping portion controlling portion 160 drives the gripping portion 71 under the instruction by the main controlling portion 200.

<Wireless Communication Portion>

The wireless communication portion 170 is a communication unit for sending/receiving data to/from the robot managing unit 3. The wireless communication portion 170 comprises a public network communication unit 171 and a wireless communication unit 172.

The public network communication unit 171 is a wireless communication means using a public network such as a cellphone network and a PHS (Personal Handyphone System) network. While the wireless communication unit 172 is a wireless communication means using a short-distance wireless communication such as a wireless LAN complying with the IEEE802.11b standard.

The wireless communication portion 170 selects either the public network communication unit 171 or the wireless communication unit 172 according to a connection request from the robot managing unit 3 to perform data communication therewith.

<Gripping Portion>

Figure 9:
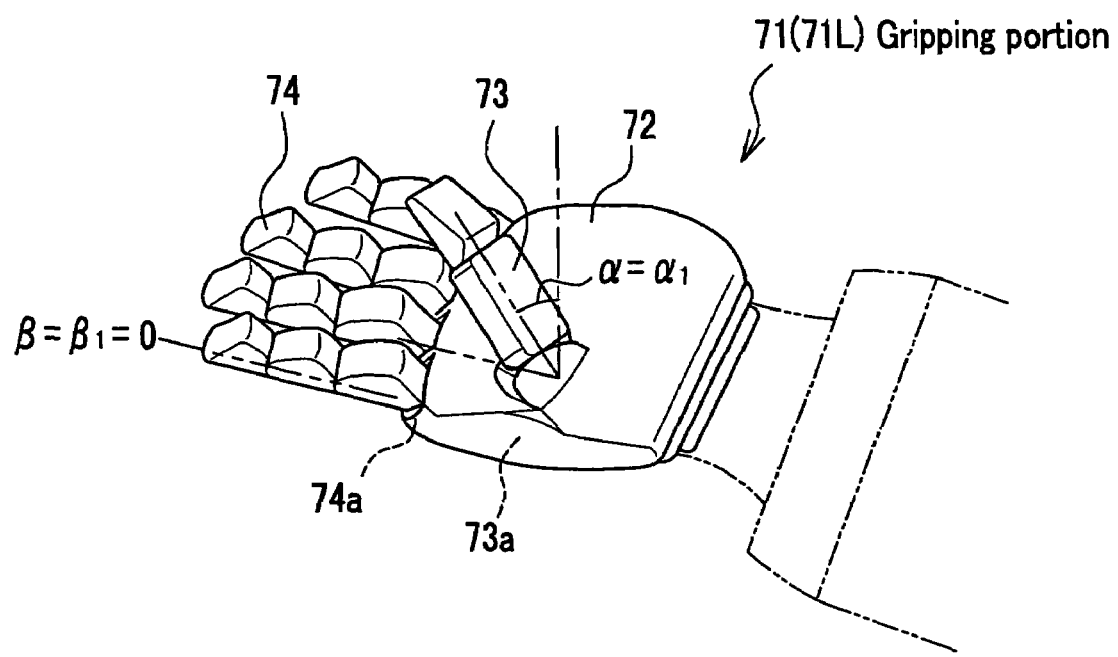
FIG. 9 is a perspective view showing a gripping portion of a robot with the fingers opened.
Figure 10:
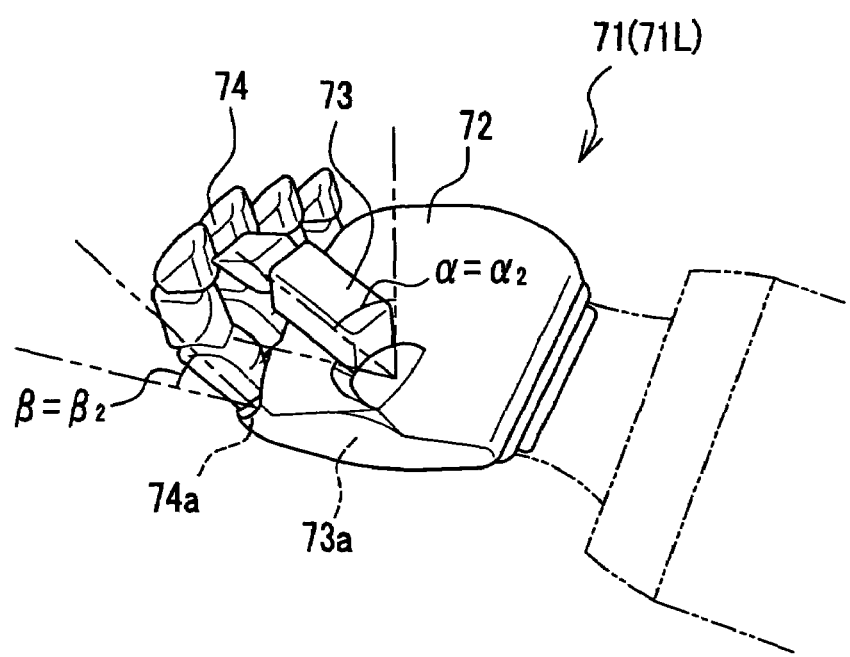
FIG. 10 is a perspective view showing a gripping portion of a robot with the fingers closed.
Figure 11:
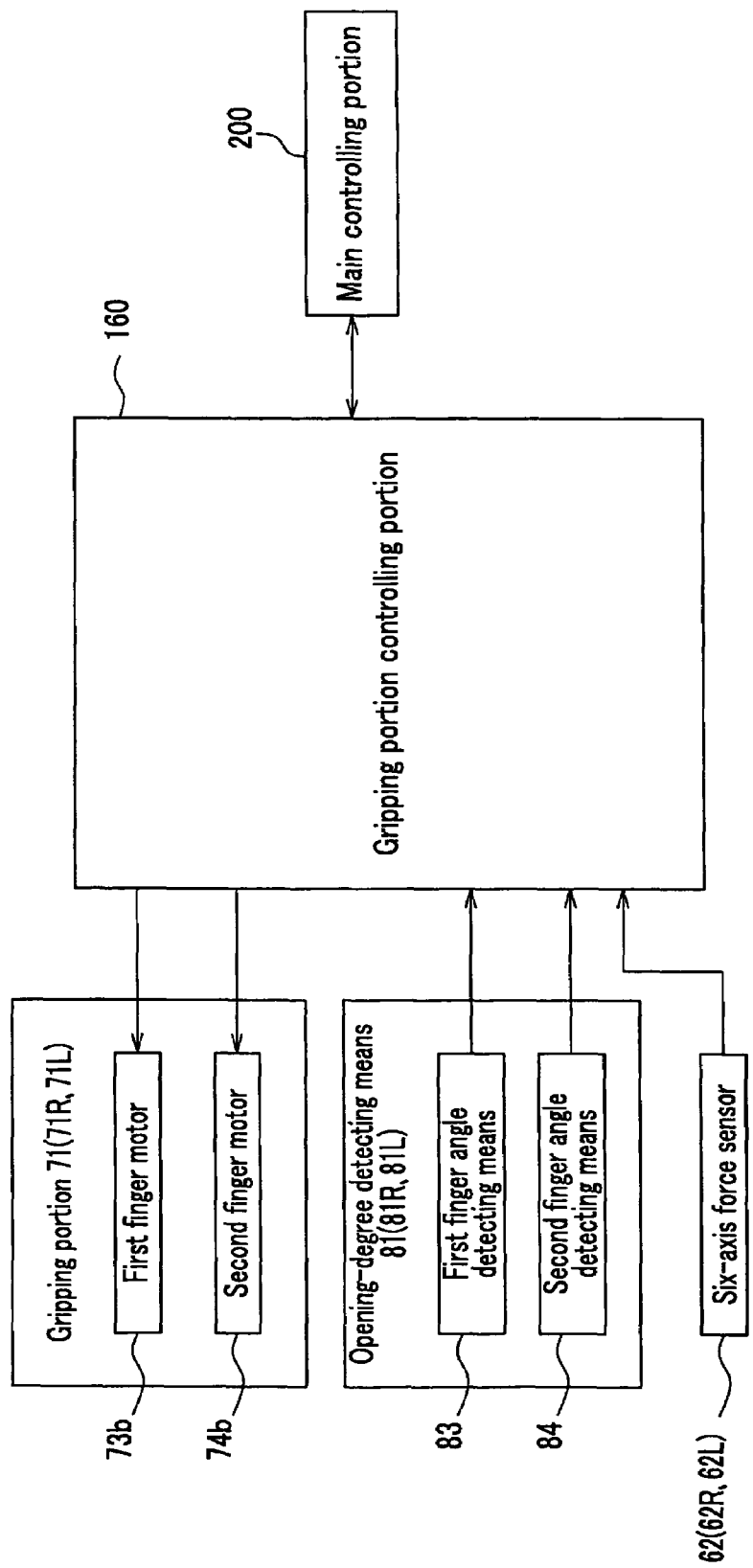
FIG. 11 is a block diagram showing a gripping portion, an opening-degree detecting means, and an external force detecting means of a robot.

Referring to FIGS. 9-11, the gripping portions 71R (L) of the robot R will be described in further detail below. FIGS. 9 and 10 are perspective views showing the gripping portion of the robot wherein the fingers are opened and closed, respectively. FIG. 11 is a block diagram showing the gripping portion, the opening-degree detecting means, and the six-axis force sensor of the robot. The pair of gripping portions 71R, 71L are mirror-symmetrical, and only the left gripping portion 71L is shown in FIGS. 9 and 10. In the discussion below, the gripping portions will be attached with numerical symbols without R and L in some cases.

As shown in FIGS. 9 and 10, the gripping portion 71 comprises a palm 72, a first finger 73, and second fingers 7.

The palm 72 is connected to the forearm link 55 via the wrist joints 36, 37 (see FIG. 3).

The first finger 73 is the portion corresponding to the thumb and is connected to the bottom end side of the palm 72 via a first finger joint 73a.

The second fingers 74 are the portions corresponding to the index, middle, ring, and little fingers, and are each connected to the end side of the palm 72 via a second finger joint 74a.

In the palm 72 are mounted a first finger motor 73b for driving the first finger 73 and a second finger motor 74b for driving the second fingers 74. In the palm 72 are also mounted a first finger angle detecting means 83 for detecting the first finger angle $\alpha$ (between the first finger 73 and the palm 72); and a second finger angle detecting means 84 for detecting the second finger angle $\beta$ (between the second fingers 74 and the palm 72), as shown in FIG. 11.

The first finger angle $\alpha$ is formed by the first finger 73 and the palm 72 and becomes larger from the opened to closed states of the fingers. The first finger angle $\alpha$ is $\alpha_1$ and $\alpha_2(\alpha_1 \leq \alpha \leq \alpha_2)$ when the fingers are opened and closed, respectively, as shown in FIGS. 9 and 10.

The second finger angle $\beta$ is formed by the second fingers 74 and the palm 72 and becomes larger from the opened to closed states of the fingers. The second finger angle $\beta$ is $\beta_1(=0)$ and $\beta_2(0 \leq \beta \leq \beta_2)$ when the fingers are opened and closed, respectively, as shown in FIGS. 9 and 10.

Here, as a value for the opening degree of the gripping portion 71, gripping angle deviation $\theta$ with respect to the first finger angle $\alpha$ and the second finger angle $\beta$ is defined as follows.

$$\theta=(\alpha_2-\alpha)+(\beta_2-\beta)$$

That is, the gripping angle deviation $\theta$ is a value representing the opening degree with respect to the fully opened state of the gripping portion 71. The value becomes the minimum: $\theta min=0$ and the maximum: $\theta max=\alpha_2+\beta_2$ when the fingers are closed and opened, respectively.

When the gripping portion 71 is gripping an item, the gripping angle deviation $\theta$ has a positive value because the fingers 73, 74 come to a stop before turning to the closed state. The gripping angle deviation $\theta$ has characteristics of becoming larger as the item to be gripped becomes thicker.

The robot control system A of the present embodiment employs the six-axis force sensor 62 as the means for detecting the external force applied from the item to the gripping portion 71. The six-axis force sensor 62 can also detect the directions of the external force, and thus forces Fx, Fy, and Fz in the directions of X, Y, and Z axes out of the forces applied to the gripping portion 71. Therefore, even when the item is heavy, it is possible to eliminate the force in the Z axis direction due to the gravitation of the item, and detect the external force (Fx in this embodiment) caused by the human in passing or receiving the item to/from the robot.

<Main Controlling Portion 200 and Memory Portion 300>

Now, with reference to FIG. 12, the main controlling portion 200 and memory portion 300 of FIG. 4 will be discussed.

Figure 12:
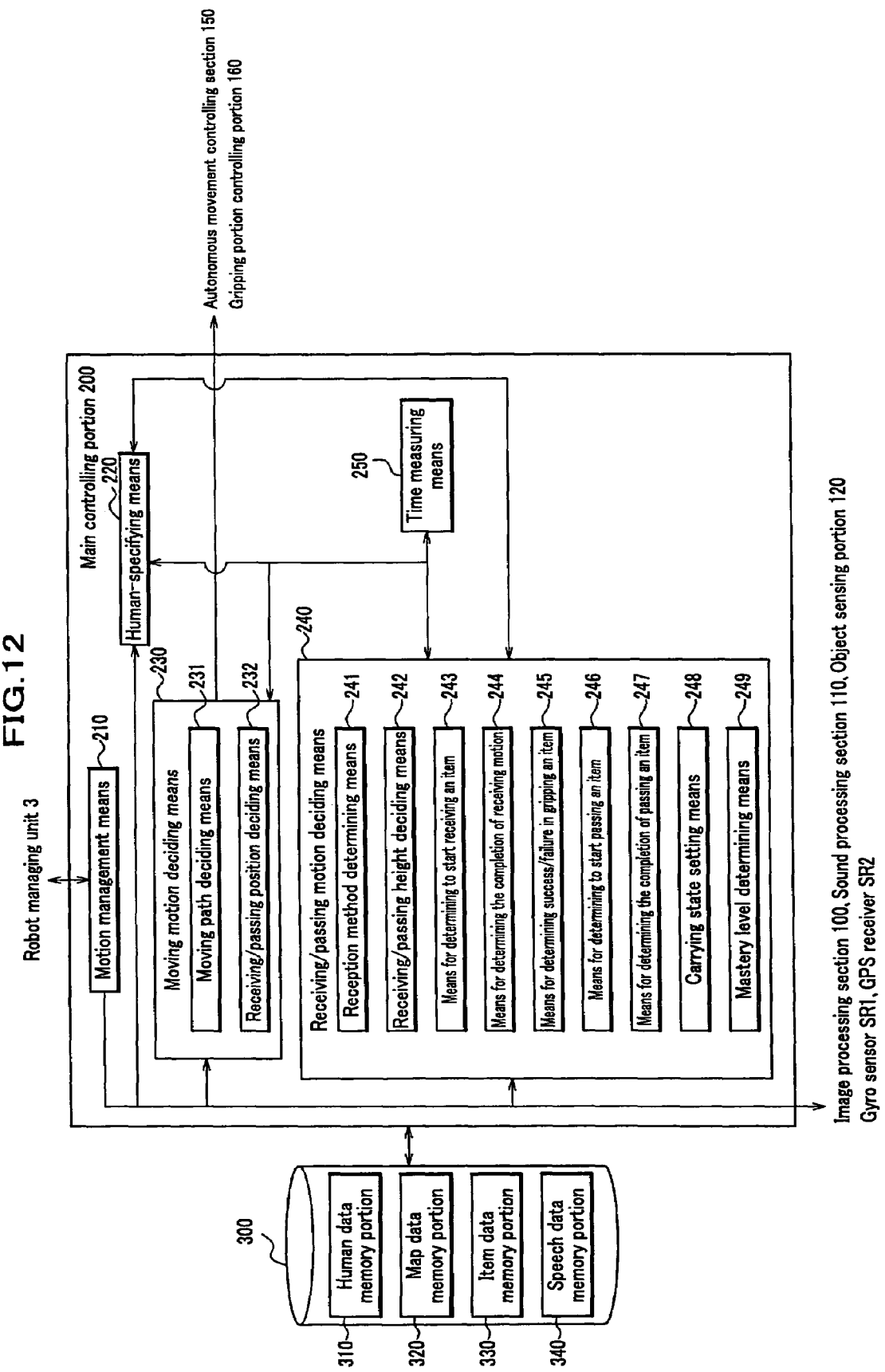
FIG. 12 is a block diagram showing a main controlling portion and a memory portion in FIG. 4.

FIG. 12 is a block diagram showing the main controlling portion and the memory portion in FIG. 4.

<Memory Portion>

As shown in FIG. 12, the memory portion 300 comprises a human data memory portion 310, a map data memory portion 320, an item data memory portion 330, and a speech data memory portion 340.

The human data memory portion 310 stores data (human data) pertaining to the humans present in the office or the task-performing area EA, the data being associated to each other.

The human data includes, for example, human ID number, name, department name, tag ID number, place where the human is usually present, desk position, face image.

The map data memory portion 320 stores data (map data) relating to the layout in the task-performing area EA, such as positions of walls and desks.

The item data memory portion 330 stores data (item data) pertaining to the items for the robot R to carry, the data being associated to each other.

The item data includes, for example, ID number, name, size, and weight of the items.

The speech data memory portion 340 stores data (speech data) for the robot R to utter. <Main Controlling Portion>As shown in FIG. 12, the main controlling portion 200 comprises a motion management means 210, a human specifying means 220, a moving motion deciding means 230, a receiving/passing motion deciding means 240, and a time measuring means 250.

<Motion Management Means>

The motion management means 210 obtains a task instruction signal sent from the robot managing unit 3, and on the basis of the signal, controls the human specifying means 220, the moving motion deciding means 230, and the receiving/passing motion deciding means 240.

The motion management means 210 outputs to the robot managing unit 3, for example, direction data and position data of the robot R detected by the gyro-sensor SR1 and the GPS receiver SR2, respectively.

The motion management means 210 also outputs to the robot managing unit 3 the motion reporting signal for reporting the task operation state of the robot R.

<Human Specifying Means>

The human specifying means 220 specifies the human detected by the object sensing portion 120, on the basis of the human information stored in the human data memory portion 310 and the tag ID number of the tag obtained by the object sensing portion 120. Because the human data memory portion 310 stores the name of the human and the tag ID number of the tag unique to the human associated to each other, it is possible to determine whether or not the human near the robot R has something to do with the task operation by referring to those data and the task instruction signal.

The human specifying means 220 further specifies who is the moving object taken by the cameras C, C, on the basis of position data of the moving object extracted by the moving-object extraction portion 102 and position data of the sensing object sensed by the object sensing portion 120.

<Moving Motion Deciding Means>

The moving motion deciding means 230 is for determining the content of the autonomous movement of the robot R, and comprises a moving path deciding means 231 and a receiving/passing position deciding means 232.

The moving path deciding means 231 determines a moving path of the robot R on the basis of the task instruction signal, the position data and the direction data of the robot R, the human data, and the map data.

The receiving/passing position deciding means 232 decides the position for the robot R to receive/pass the item from/to the human, on the basis of the position data on the moving object (human) detected the moving-object extraction portion 120.

When the receiving/passing position deciding means 232 decides the receiving/passing position, the moving path deciding means 231 decides the moving path on which the robot R moves to the position. The receiving/passing position where the robot passes/receives the item to/from the human in a preferable manner is decided using the preset distance a1 (see FIG. 14).

<Receiving/Passing Motion Deciding Means>

The receiving/passing motion deciding means 240 is for determining the motion of the gripping portion 71 in the item-carrying operation, and comprises: a reception method deciding means 241; a receiving/passing height deciding means 242; means for determining to start receiving an item 243; means for determining the completion of a receiving motion 244; means for determining success/failure in gripping an item 245; means for determining to start passing an item 246; means for determining the completion of passing an item 247; a carrying state setting means 248, and a mastery level determining means 249, The reception method deciding means 241 determines a receiving method on the basis of the instruction signal and the item data stored in the item data memory portion 330.

The robot R of the present invention can select two receiving methods: use of one hand or both hands.

The one-hand and both-hand methods use one gripping portion 71R (or 71L) and both gripping portions 71R, 71L, respectively, to receive the item. The reception method deciding means 241 selects one of the two methods, on the basis of the size and weight in the item data. For example, the both-hand method is selected for receiving an item such as an A4 sized document that is receivable with both hands, and the one-hand method for receiving a small-sized item not receivable with both hands.

<Receiving/Passing Height Deciding Means>

The receiving/passing height deciding means 242 decides the height a3 at which the gripping portion 71 is to grip an item (see FIG. 17), on the basis of the body height of the human calculated by the moving-object extraction portion. The height a3 is where the robot R passes/receives the item to/from the human in a preferable manner, and is selected in one of the three preset steps based on the calculated body height.

Via the autonomous movement controlling section 150, the receiving/passing height deciding means 242 causes the gripping portion 71 to be held at the height of a3, with the direction from the human to the gripping portion 71 becoming a2, and the gripping portion 71 aligned with the center (central vertical line) of the human calculated by the <Means for Determining to Start Receiving an Item>

The means for determining to start receiving an item 243 determines whether or not the human is holding an item at a receivable position for the robot R and the robot R can start receiving the item, and if yes, causes the gripping portion 71 to start the receiving motion.

The means for determining to start receiving an item 243 determines that the receiving motion can be started and drives the gripping portion 71 via the gripping portion controlling portion 160 to perform the finger closing motion, if the six-axis force sensor 62 detects the force Fx in the x axis as not less than a predetermined valued Fx1 (first predetermined value) when the gripping portion 71 is not gripping an item, in particular, in a reception-wait state to be discussed later.

This is a control utilizing that the human passing an item to the robot R presses the item against the palm 72.

<Means for Determining the Completion of Receiving Motion>

The means for determining the completion of a receiving motion 244 determines if the receiving motion has completed while the gripping portion 71 is receiving an item.

The means for determining the completion of a receiving motion 244 determines so if the six-axis force sensor 62 detects the force Fx in the x axis as not more than a predetermined valued Fx2 (second predetermined value; Fx2≦Fx1).

This is a control using a decrease in the pressing force against the palm 72 caused by the human who has judged the robot R has received the item and released the hands therefrom.

The means for determining the completion of a receiving motion 244 determines the receiving motion has completed, if the opening degree of the gripping portion 71 is not more than a predetermined value, i.e., if the gripping angle deviation θ is not more than a (third) predetermined value θ1 (e.g., θ=0) in the reception-wait state.

On determining that the receiving motion is completed, the means for determining the completion of a receiving motion 244 drives the gripping portion 71 via the gripping portion controlling portion to generate a torque in the finger closing direction for gripping the item.

<Means for Determining Success/Failure in Gripping an Item>

The means for determining success/failure in gripping an item 245 determines whether the gripping portion has gripped the item successfully or failingly.

In the present embodiment, when both hands are used to grip the item, the means for determining success/failure in gripping an item 245 moves the gripping portions 71R, 71L closer or apart to/from each other via the arm controlling portion 152. Then, the means for determining success/failure in gripping an item 245 determines whether or not both of the gripping portions 71R, 71L are gripping the item, on the basis of the reaction force Fy from the item detected by the six-axis force sensor.

The means for determining success/failure in gripping an item 245 determines the gripping is successful if the reaction force Fy is not less than a predetermined value Fy1 (fifth predetermined value).

<Means for Determining to Start Passing an Item>

The means for determining to start passing an item 246 determines whether the human is about to receive the item from the robot R when the robot is holding the item at a receivable position for the human, and if yes, then causes the gripping portion 71 to start receiving the item.

In the reception-wait state to be discussed later, the means for determining to start passing an item 246 determines the receiving motion can be started if the force Fx in the X axis detected by the six-axis force sensor is not less than a predetermined value Fx3, and drives the gripping portions 71 via the gripping portion controlling portion 160 to open the fingers.

This is a control utilizing that the human receiving the item from the robot R pulls the item.

The means for determining to start passing an item 246 determines the receiving motion can be started if the opening degree of the gripping portions 71 is not more than a predetermined value, that is, the gripping angle deviation θ is not more than a predetermined value θ2 (e.g., θ=0) in the reception-wait state.

This is a control utilizing that the human receiving the item from the robot R pulls and removes the item from the gripping portions 71, and thus the gripping portions 71 are closed with the gripping torque.

<Means for Determining the Completion of Passing an Item>

The means for determining the completion of passing an item 247 determines that the receiving motion has completed, if the force in the X axis detected by the six-axis force sensor is not more than a predetermined value Fx4 (Fx4≦Fx3) in the item-receiving state to be described later.

This is a control utilizing a decrease in the external force Fx caused by the item to the gripping portions 71 when the human has completed receiving the item from the robot R.

<Means for Setting Carrying State>

The carrying state setting means 248 detects, sets, and updates the state of the gripping portion 71.

The gripping portion 71 has the followings states.
1. Free: The item-carriage request is not requested.
2. Reception-wait: The robot is holding the gripping portion to the human and waiting for the human to pass the item to the robot.
3. Receiving: The robot is receiving the item from the human, i.e., the human is passing the item to the robot.
4. Receiving motion completed: The human has released the item from the hands and the item is (seems to be) on the side of the robot.
5. Determining gripping success/failure: The robot determines if gripping the item has succeeded/failed.
6. Reception failed: The robot has failed in receiving the item from the human.
7. Gripping completed: The robot has succeeded in receiving the item from the human and is gripping the item.
8. Passing-wait: The robot is holding the gripping portions toward the human and waiting for the human to receive the item.
9. Passing: The robot is passing the item to the human, and the human is receiving the item from the robot.
10. Passing completed: The robot has successfully passed the item to the human, i.e., the human has successfully received the item, which is now on the side of the human.
11. Error: The item dropped during carriage, for example.

<Mastery Level Determining Means>

The mastery level determining means 249 determines the mastery level of the human in the receiving/passing motion.

The mastery level determining means 249 uses the time measuring means 250, which is a clock provided in the main controlling portion 200 to measure the time required for the reception-wait state to change to the receiving state, or for the passing-wait state to the passing state. On the basis of the measured length of time, the mastery level determining means 249 determines the mastery level of the human. Here, the mastery level determining means 249 determines the mastery levels as high, middle, and low in the order from shorter to longer measuring time.

On the basis of the mastery level, the gripping portion controlling portion 160 sets the speed with which to close/open the fingers. That is, when the robot R conducts the receiving/passing motion to a human who is determined to have a low mastery level, the receiving/passing motion deciding means 240 causes the gripping portions 71 to slowly close/open the fingers to avoid giving the human a sense of discomfort.

When the robot R performs the receiving/passing motion to a human who is determined to have a high mastery level, the receiving/passing motion deciding means 240 causes the gripping portions 71 to fastly close/open the fingers to avoid giving the human a sense of botheration.

Based on the mastery level, the receiving/passing motion deciding means 240 also determines and then makes the speaker S output a speech base on speech data.

<Robot Motion Example>

The robot R of the present invention will be discussed in terms of the item-carrying motion. Here, an exemplary case is taken in which the robot R has received an instruction signal pertaining to a task such as "receiving an item M from the human H1 and then pass the item M to the human H2". The item M is an A4 sized document that the robot R can grip with both hands.

<Moving to the Receiving Position>

Figure 13:
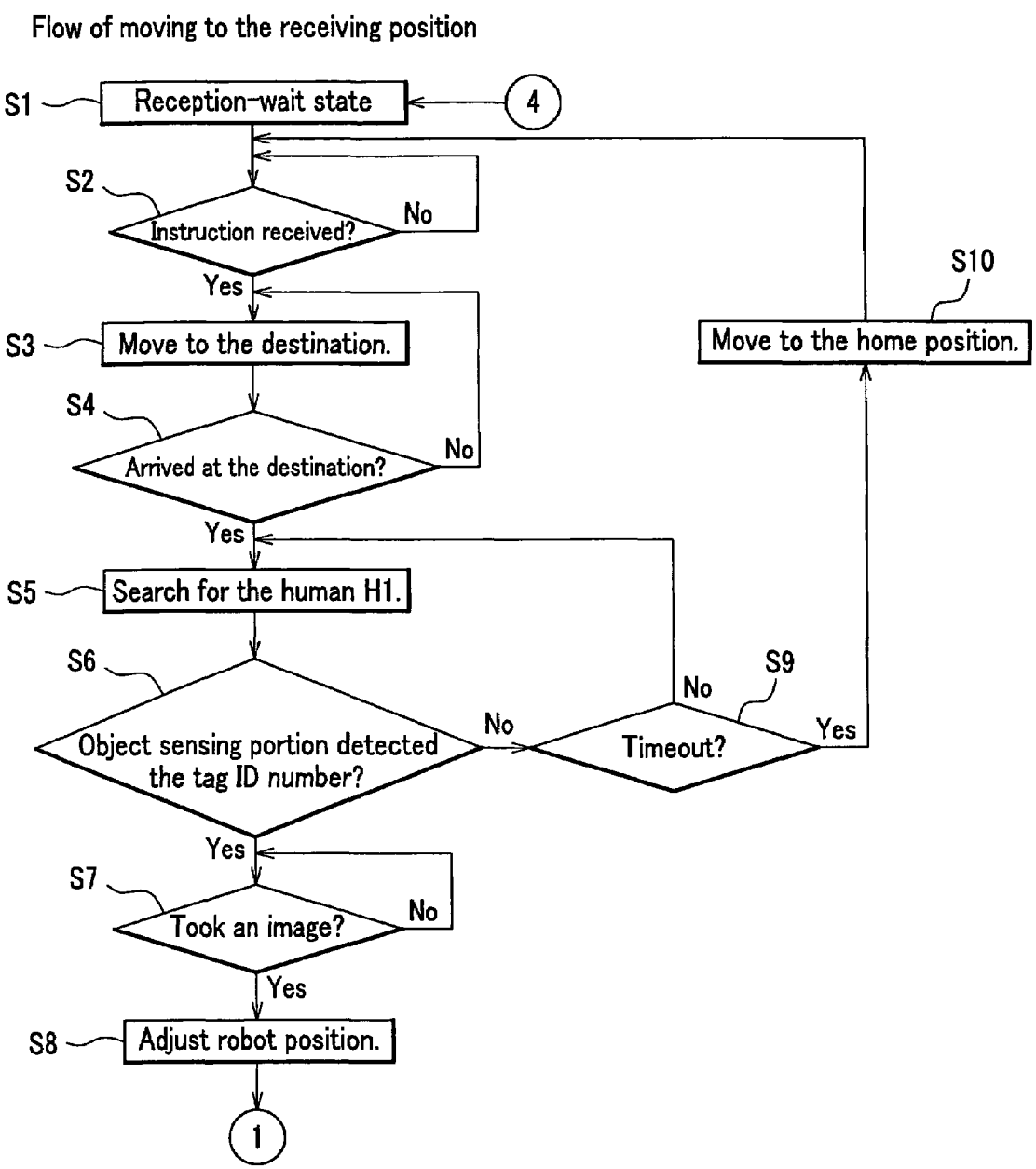
FIG. 13 is a flowchart showing an item-carrying operation by a robot control system according to an embodiment of the invention, in which the robot is shown to move to a receiving position.

First, movement of the robot R toward the receiving position will be described. FIG. 13 is a flowchart showing an item-carrying operation by a robot control system according to an embodiment of the invention, in which the robot is shown to move to a receiving position.

First, the robot R is waiting in the home position provided in the task task-performing area EA (Step 1).

If the robot R receives the instruction signal sent from the robot managing unit 3 (Yes in Step 2), then the robot R starts moving from the home position to a location where the human H1 is usually present P1 (Step 3). On arriving at the location P1 (Yes in Step 4), the robot R stops moving and starts searching for the human H1 (Step 5).

Figure 14:
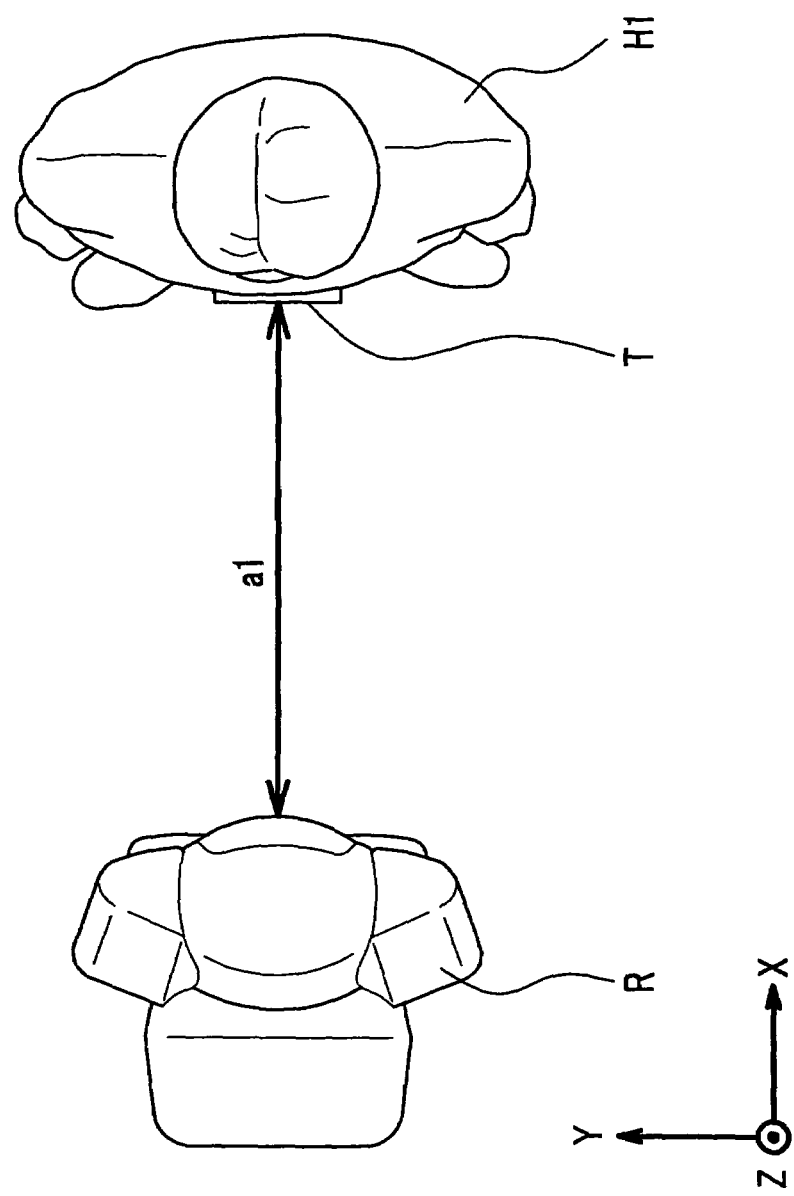
FIG. 14 is a drawing to show a robot having moved to a receiving position.

On sensing the tag ID number of the human H1 using the object sensing portion 120 (Yes in Step 6), the robot R takes an image of the human H1 using the cameras C, C (Yes in Step 7), and then moves to the front of the human H1 as shown in FIG. 14 (Step 8). In FIG. 14, the robot R is shown to have moved to the receiving position determined by the receiving/passing position deciding means 232.

If the object sensing portion 120 could not sense the tag ID number of the human H1 within a predetermined time period (Yes in Step 9), the robot R generates and outputs to the robot managing unit 3 a motion reporting signal for reporting that the motion management means 210 could not perform the task, and then moves back to the home position (Step 10).

<Receiving Motion>

Figure 15:
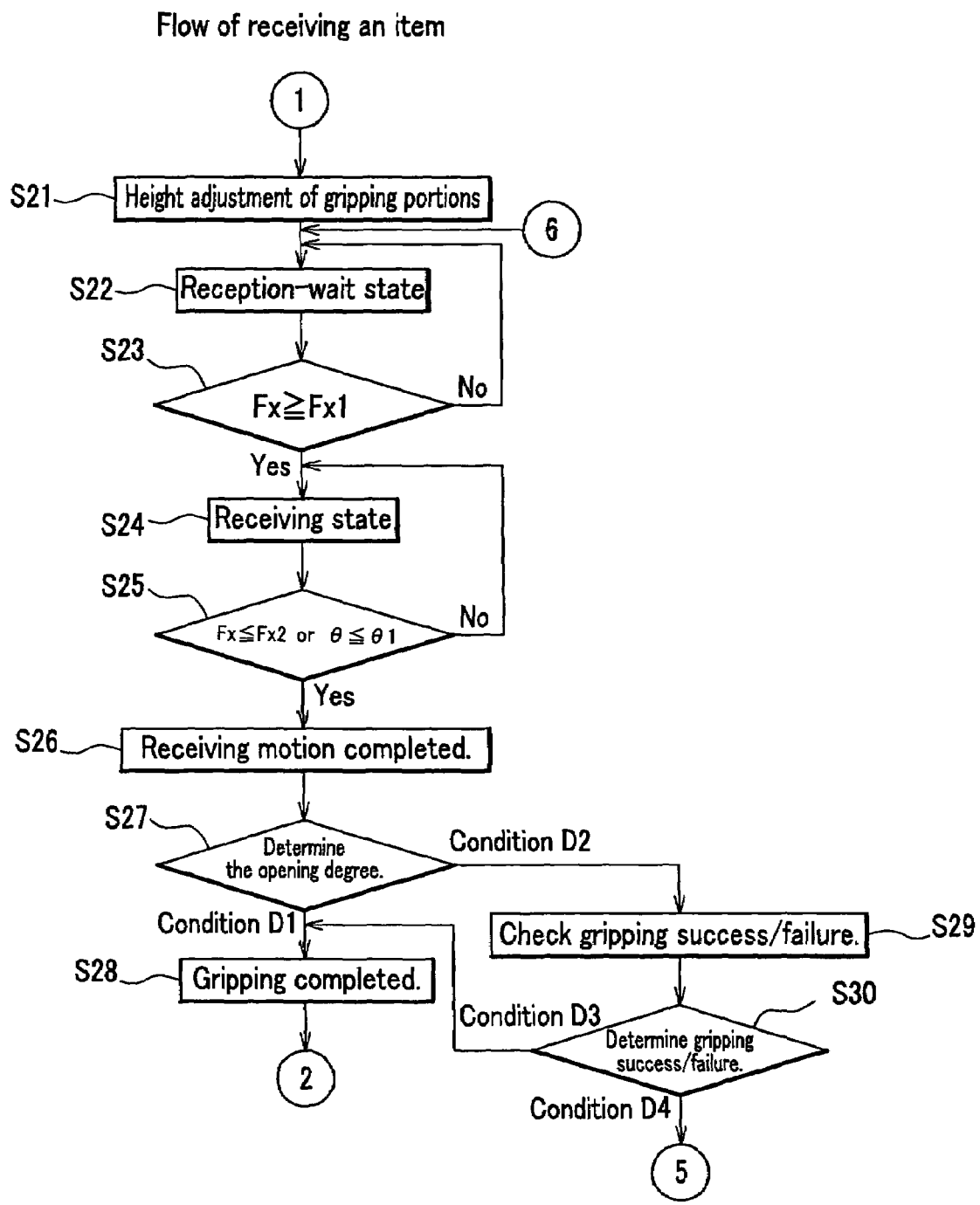
FIG. 15 is a flowchart to show an item-carrying operation by a robot control system according to an embodiment of the invention, in which is shown an item-receiving motion.

Next will be discussed the receiving motion of the robot R. FIG. 15 is a flowchart to show an item-carrying operation by the robot control system according to an embodiment of the invention, in which is shown an item-receiving motion.

Figure 16:
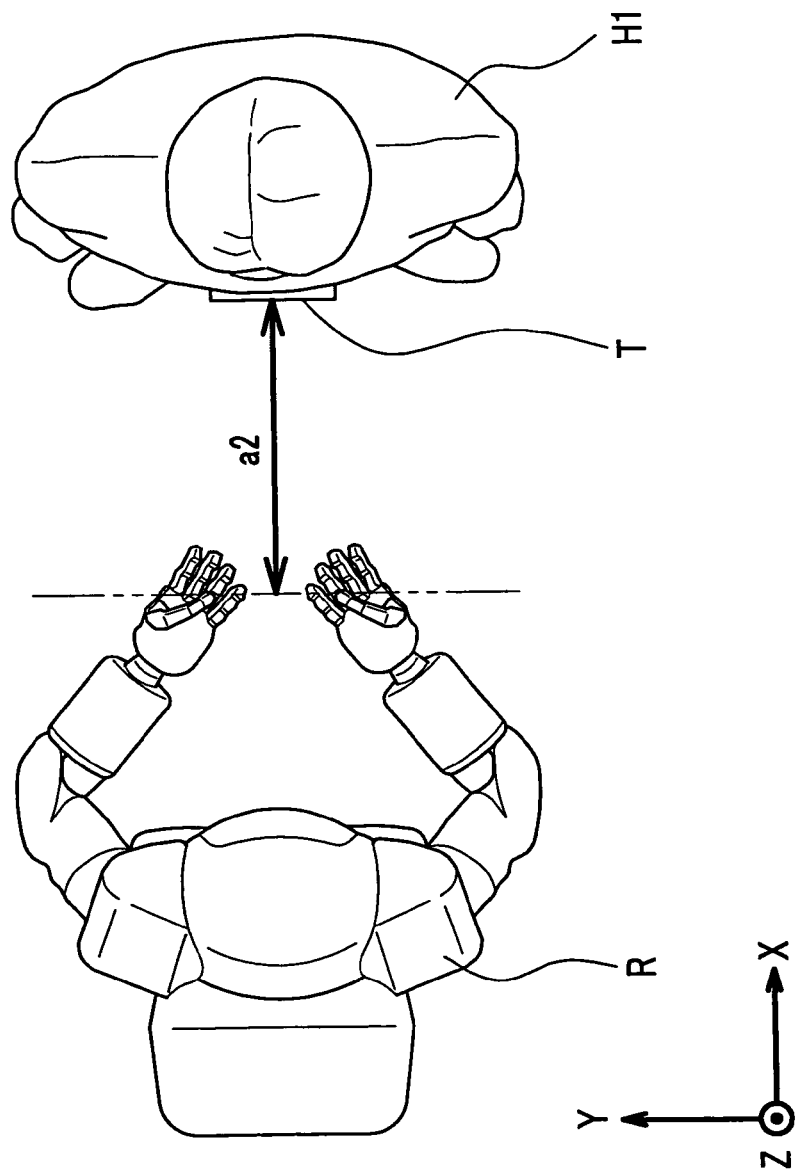
FIG. 16 is a top view to show a robot holding gripping portions to a height for receiving an item from the human.
Figure 17:
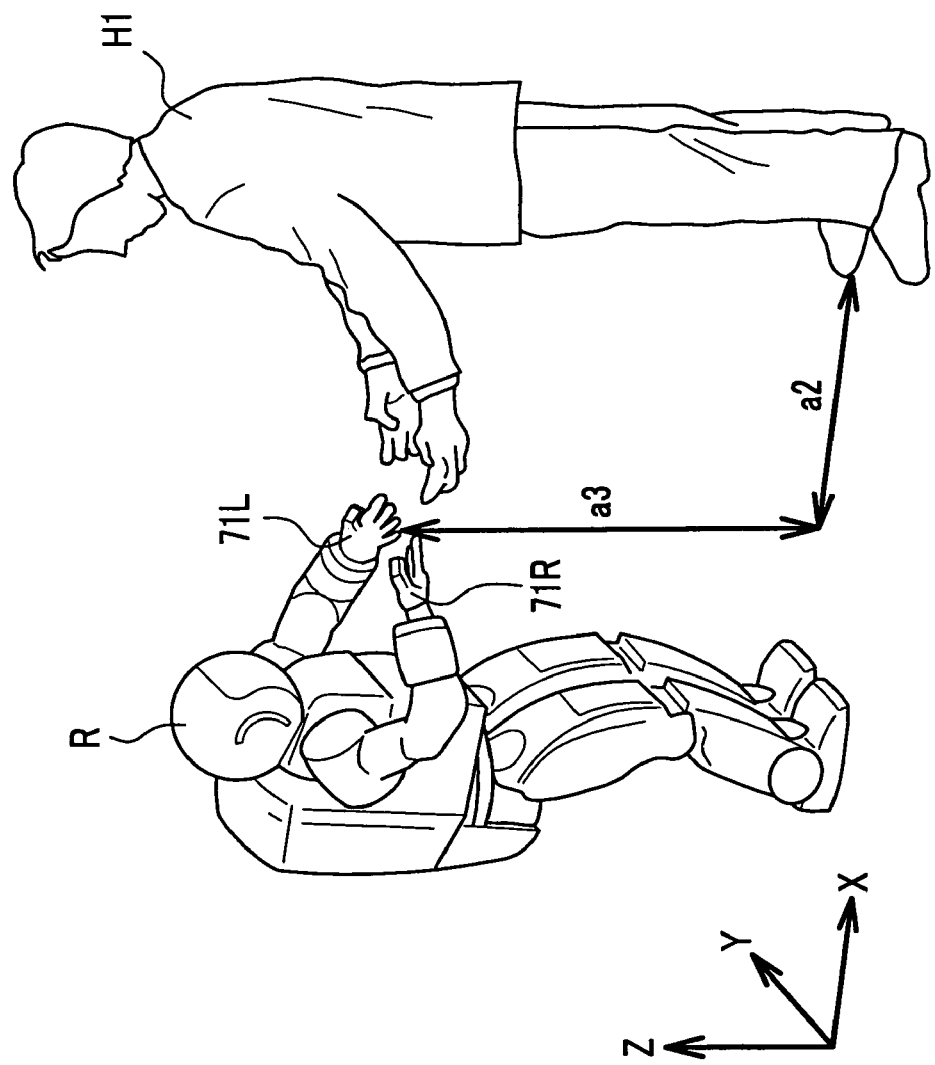
FIG. 17 is a perspective view to show a robot holding gripping portions to a height for receiving an item from the human.

After moving back to the receiving position, the robot R holds the gripping portions 71R, 71L with the fingers opened to the height determined by the receiving/passing height deciding means 242 as shown in FIGS. 16 and 17 (Step 21).

As shown in FIGS. 16 and 17, the robot R holds the gripping portions 71 (71R, 71L) to the height a3 decided by the receiving/passing height deciding means 242 such that the distance from the human H1 to the gripping portions 71R, 71L is a2. Further, the robot R aligns the direction of holding the gripping portions 71R, 71L with the center (central vertical line) of the human H1 calculated by the moving-object extraction portion 102.

On completion of the holding motion of the gripping portions 71R, 71L, the carrying state setting means 248 sets the carrying state to the "reception-wait" state, and the robot R utters "Please pass me the item M" (Step S22)

Figure 18:
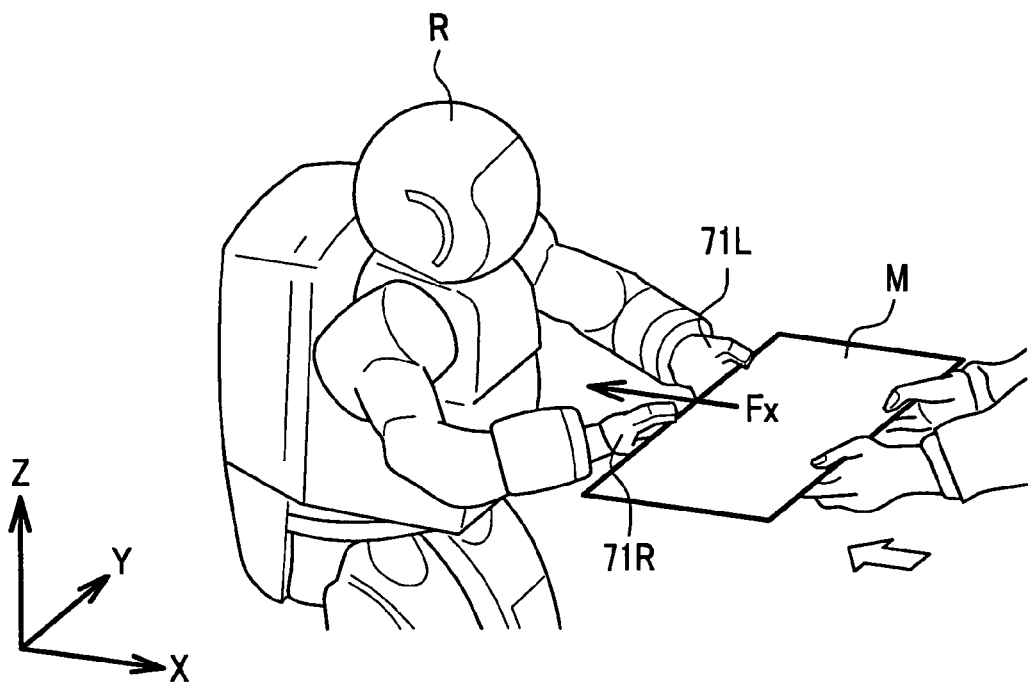
FIG. 18 is a drawing to show a robot having started receiving an item from the human.

When the robot R detects an external force Fx not less than Fx1 with the six-axis force sensors 62R, 62L in the reception-wait state, the carrying state setting means 248 sets the carrying state as "receiving", and the robot R starts closing the gripping portions 71R, 71L (Step 24). In FIG. 18 is illustrated a situation in which the robot R has started receiving the item M.

Figure 19:
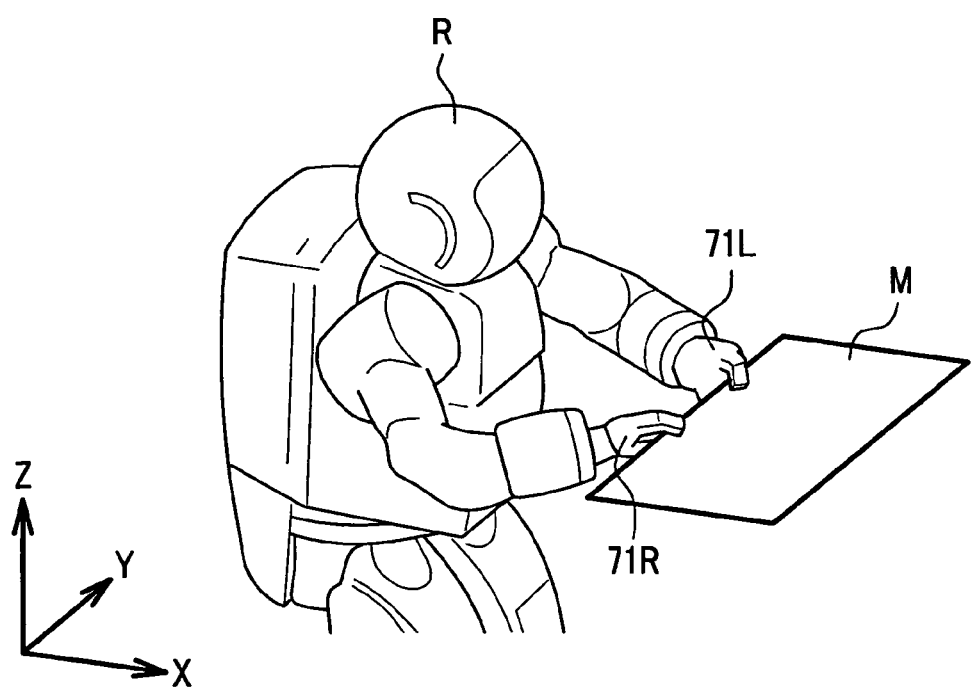
FIG. 19 is a drawing to show a situation in which a robot has completed receiving an item from the human.

If the six-axis force sensor detects a force Fx not more than Fx2 or if the gripping angle deviation θ is not more than θ1 in the receiving state (Yes in Step 25), then the carrying state setting means 248 sets the carrying state as "receiving motion completed", and the gripping portions 71R, 71L grip the item M, as shown in FIG. 19.

Thereafter, the means for determining success/failure in gripping an item 245 determines the opening degrees of the gripping portions 71R, 71L (Step 27).

If the opening degrees for both of the gripping portions 71R, 71L, i.e., the gripping angle deviation, is not less than a predetermined value θ3 or a fourth predetermined value (condition D1), the means for determining success/failure in gripping an item 245 determines that the item M is thick and that both of the gripping portions 71R, 71L have gripped the item M, and the carrying state setting means 248 sets the carrying state as "gripping completed" (Step 28).

If at least one of the gripping portions 71R, 71L has a gripping angle deviation θ less than a predetermined value θ3 (condition D2), then the carrying state setting means 248 sets the carrying state as "determining gripping success/failure" (Step 29), and the means for determining success/failure in gripping an item 245 determines the success/failure (Step 30).

Specifically, the robot R moves closer or apart the gripping portions 71R, 71L to make the six-axis force sensors 62R, 62L detect the reactive force Fy applied from the item M. If the reaction force Fy is not less than the predetermined value Fy1 (condition 3), then the means for determining success/failure in gripping an item 245 determines the gripping is successful, the carrying state setting means 248 sets the carrying state as "receiving motion completed", and the gripping portions 71R, 71L grip the item M.

If the reaction force Fy is less than the predetermined value Fy1 (condition 4), the means for determining success/failure in gripping an item 245 determines that the gripping is failed, and the carrying state setting means 248 sets the carrying state as "reception failed".

Here, with reference to FIGS. 20A, 20B, 20C, determination on the gripping success/failure will be discussed.

As shown in FIG. 20A, when both of the gripping portions 71R, 71L are gripping the item M, moving the gripping portions closer will cause the reaction force Fy (not less than the predetermined value Fy1) due to the item M.

As shown in FIG. 20B, when only one of the griping portions 71R, 71L is gripping the item M (71R in the drawing), moving the gripping portions closer will only result in a small reaction force Fy due to the item M (Fy2≦Fy≦Fy1).

As shown in FIG. 20C, when none of the griping portions 71R, 71L is gripping the item M, moving the gripping portions closer will cause no reaction force Fy due to the item M (Fy=0).

Thus, the means for determining success/failure in gripping an item 245 can determine whether or not the robot R is gripping the item with both hands (gripping portions 71R, 71L) by determining the gripping is successful if the reaction force Fy is not less than the predetermined value Fy1.

<Preparation for Re-Receiving an Item>

Figure 21:
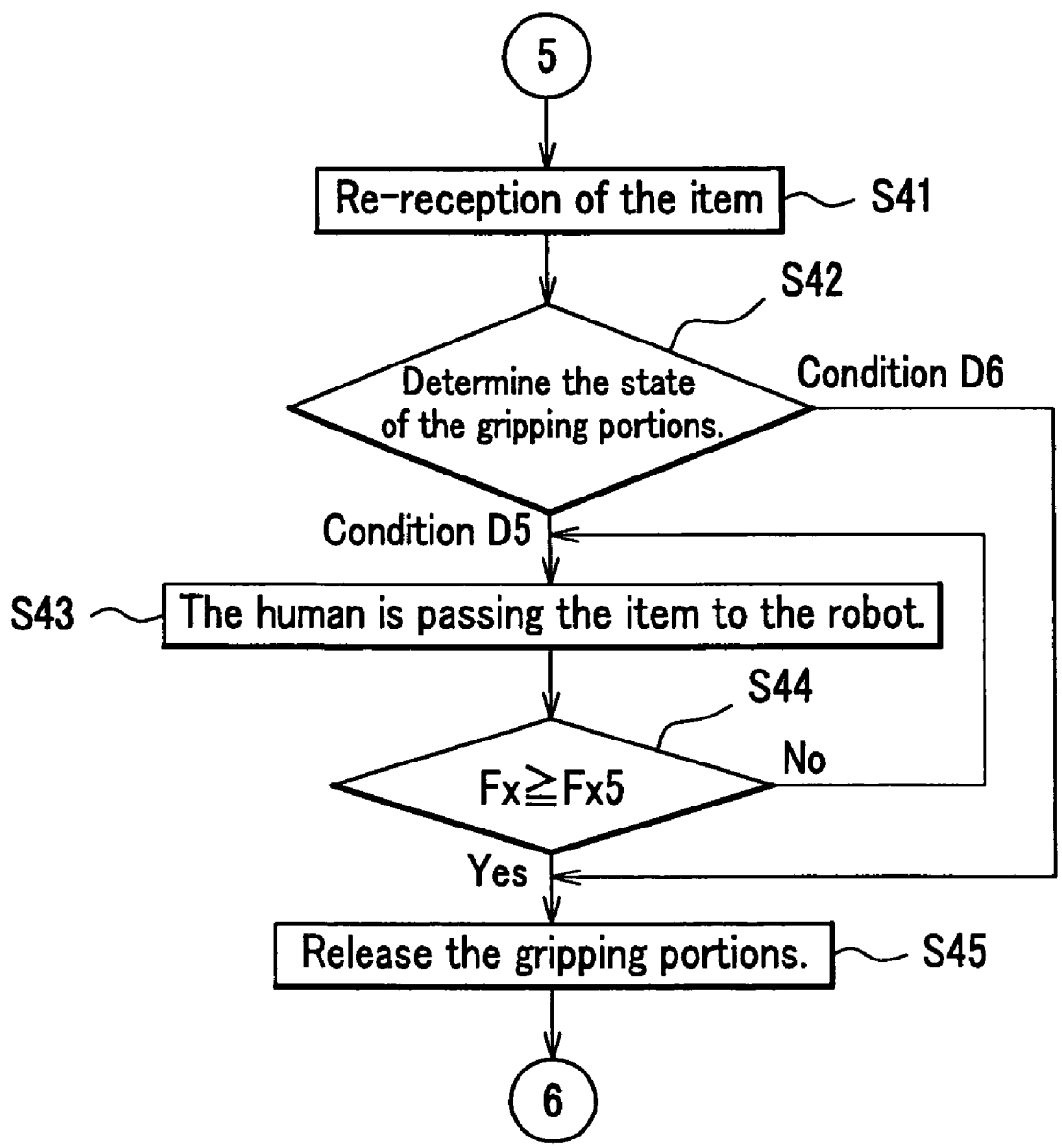
FIG. 21 is a flowchart to show an item-carrying operation by a robot control system according to an embodiment of the invention, in which a robot prepares for re-receiving an item from the human.

Next will be described preparation by the robot R for re-receiving an item. FIG. 21 is a flowchart to show an item-carrying operation by the robot control system according to an embodiment of the invention, in which a robot prepares for re-receiving the item from the human.

If the means for determining success/failure in gripping an item 245 determines that the gripping has failed (condition 4 in Step 29), then the carrying state setting means 248 sets the state of the gripping portions as "reception failed" (Step 41), and the means for determining success/failure in gripping an item 254 determines the state of the gripping portions 71R, 71L (Step 42). In determining the gripping success/failure, if at least one of the six-axis force sensor 62R, 62L detects an external force Fy other than the predetermined value Fy2 (condition 5 in Step 42), then the carrying state setting means 42 sets the carrying state as "reception-wait", and the robot R utters "Please, take the item M and pass it to me again" (Step 43).

If one of the six-axis force sensors 62R, 62L on the side gripping the item M detects an external force Fx not less than a predetermined value Fx5 (Yes in Step 44), then the carrying state setting means 248 sets the carrying state as "passing the item", and the gripping portions 71R, 71L are released (Step 45). Thereafter, this step proceeds to Step 22 to reperform the receiving motion.

It is to be noted that if the gripping angle deviation θ of the gripping portions 71R, 71L is not more than a predetermined value θ4, e.g., θ=0 (condition D6), in the judgment of the gripping success/failure in Step 42, then the robot R utters "Please pass me the item M again" and the gripping portions 71R, 71L are released (Step 45). Thereafter, this step proceeds to Step 22 to reconduct the receiving motion.

<Moving and Carrying an Item>

Figure 22:
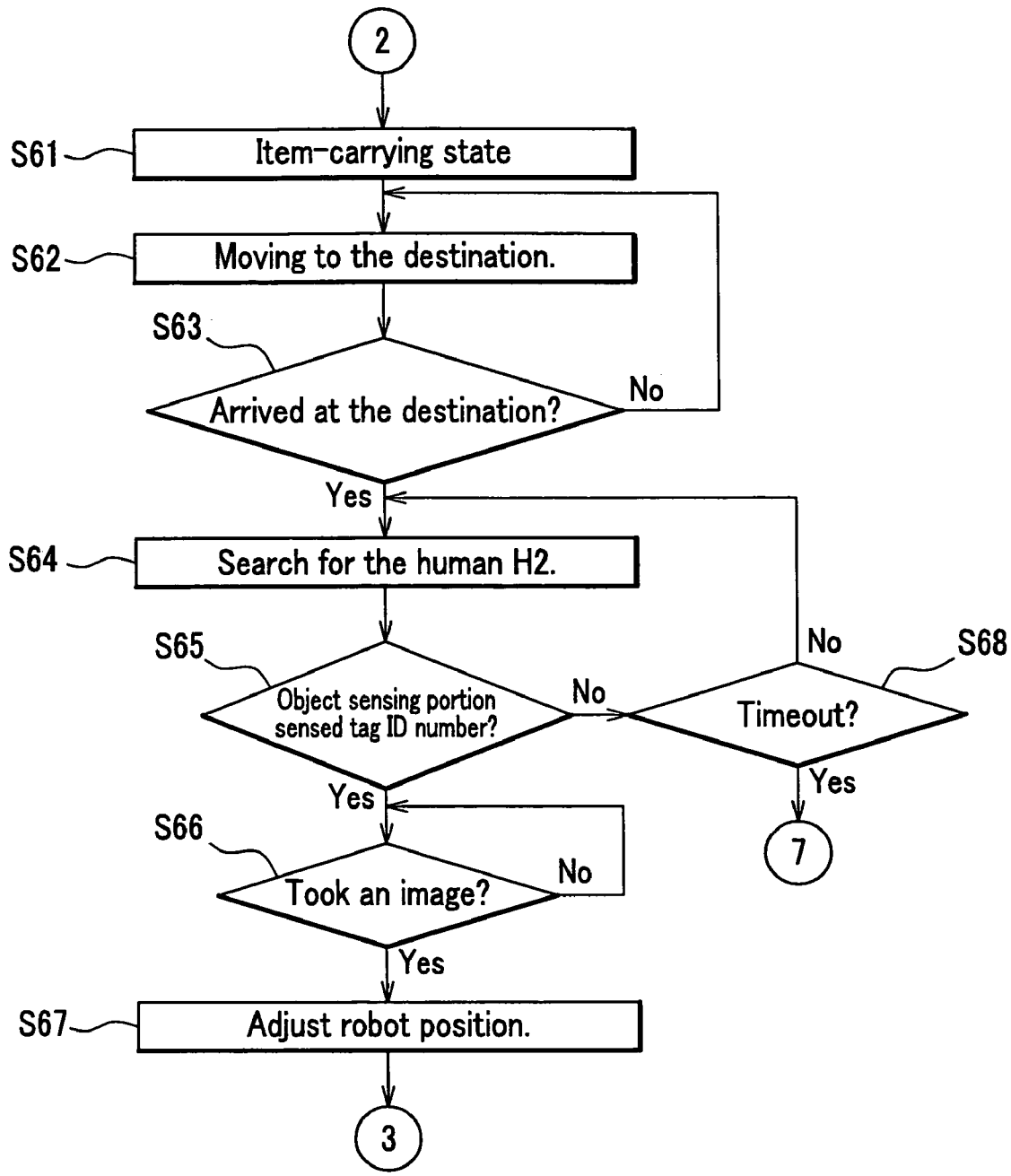
FIG. 22 is a flowchart to show an item-carrying operation by a robot control system according to an embodiment of the invention, in which a robot moves to carry an item.

Next will be discussed movement of the robot R for carrying the item. FIG. 22 is a flowchart to show an item-carrying operation by the robot control system according to an embodiment of the invention, in which the robot moves and carries the item.

Figure 23:
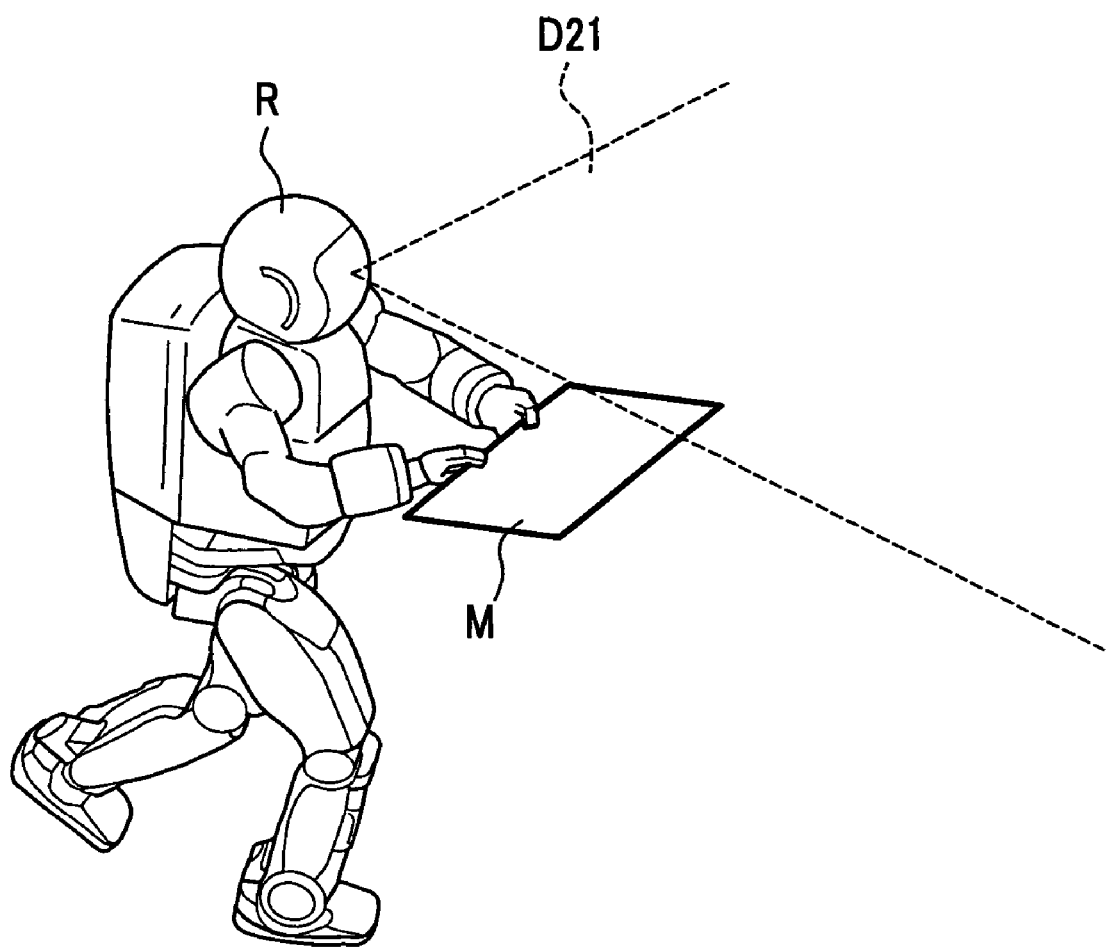
FIG. 23 is a drawing to show a robot carrying an item.

If gripping the item is completed in Step 28, then the robot R moves the gripping portions 71R, 71L to a position (dead angle) out of the viewing area D21 (see FIG. 23) of the cameras C, C (Step 61), in order to prevent the gripped item M from intervening the camera view.

The robot R then starts moving from the reception position to a location where the human H2 is usually present P2 (Step 62). On arriving at the location P2 (Yes in Step 63), the robot R stops moving and starts searching for the human H2 (Step 64).

On detecting the tag ID number of the human H2 using the object sensing portion 120 (Yes in Step 65), the robot R obtains an image of the human H2 using the cameras C, C (Yes in Step 66), and moves to the front of the human H2 (Step 67).

If the object sensing portion 120 has failed in detecting the tag ID number of the human H2 within a predetermined time period (Yes in Step 68), then the robot R carries the item M to the item storage site B1 provided in the task-performing area EA (see FIG. 1).

<Motion of Passing an Item>

Figure 24:
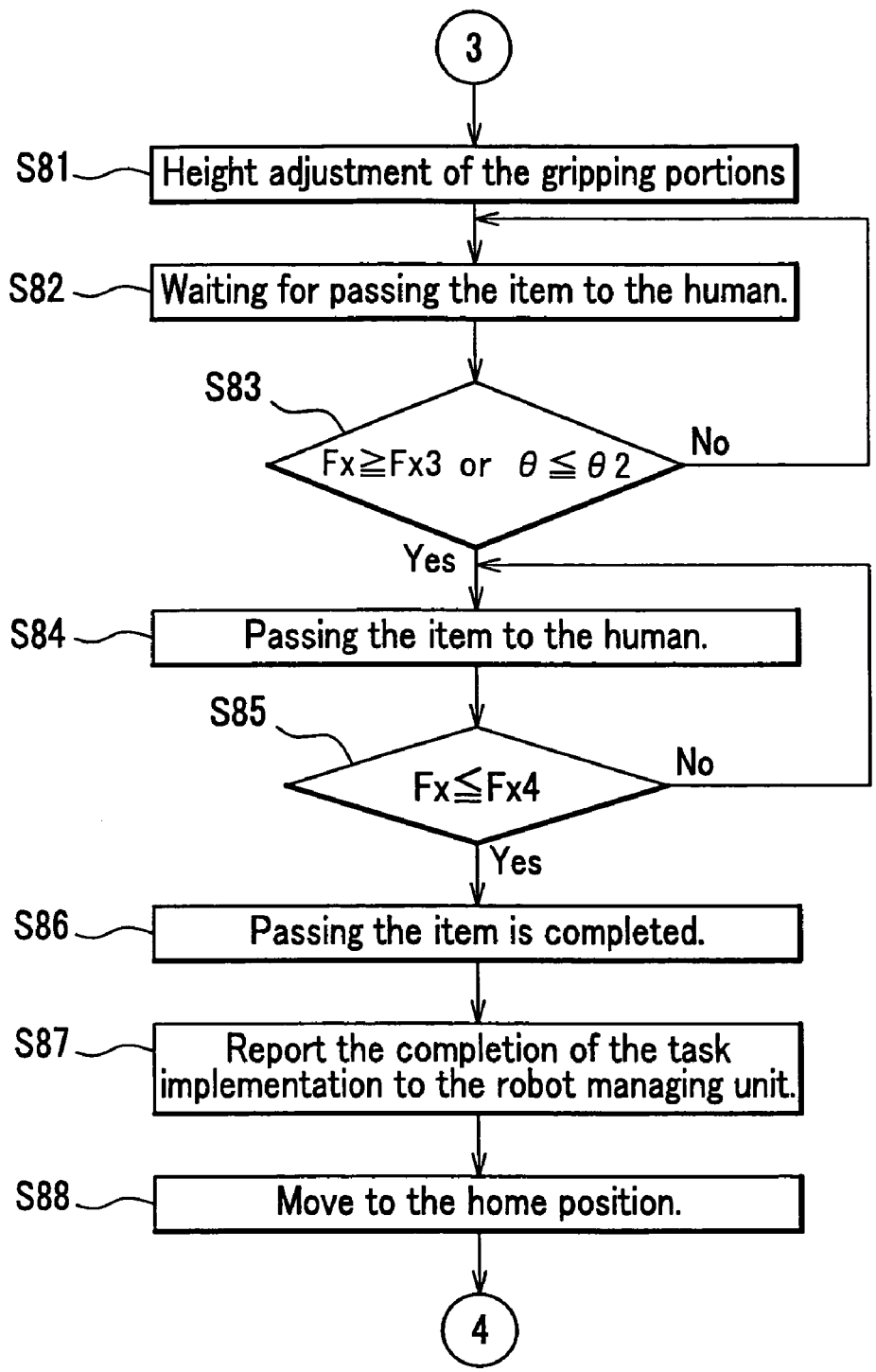
FIG. 24 is a flowchart to show an item-carrying operation by a robot control system according to an embodiment of the invention, in which is illustrated a motion of passing an item to a human.

Next is described a motion by the robot R of passing an item to the human. FIG. 24 is a flowchart to show an item-carrying operation by the robot control system according to an embodiment of the invention, in which the robot passes the item to the human.

Figure 25:
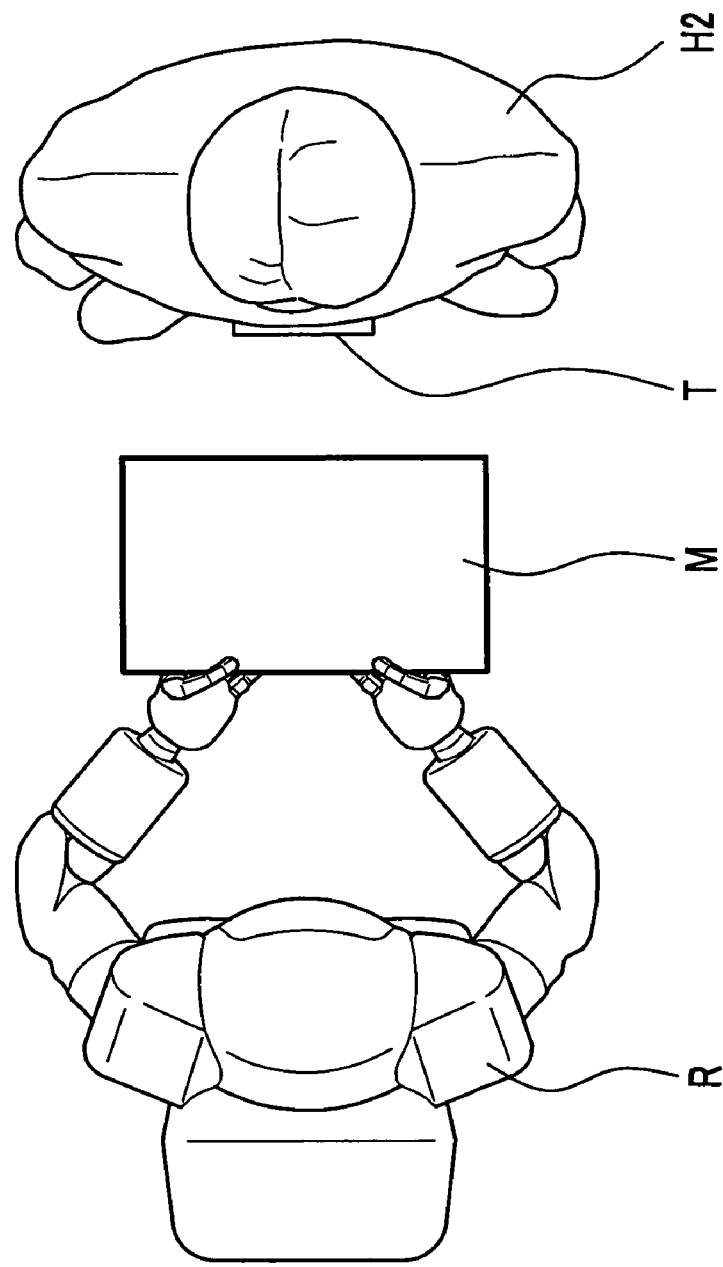
FIG. 25 is a top view to show a robot having moved to a passing position and holding gripping portions to a height for passing an item to a human.
Figure 26:
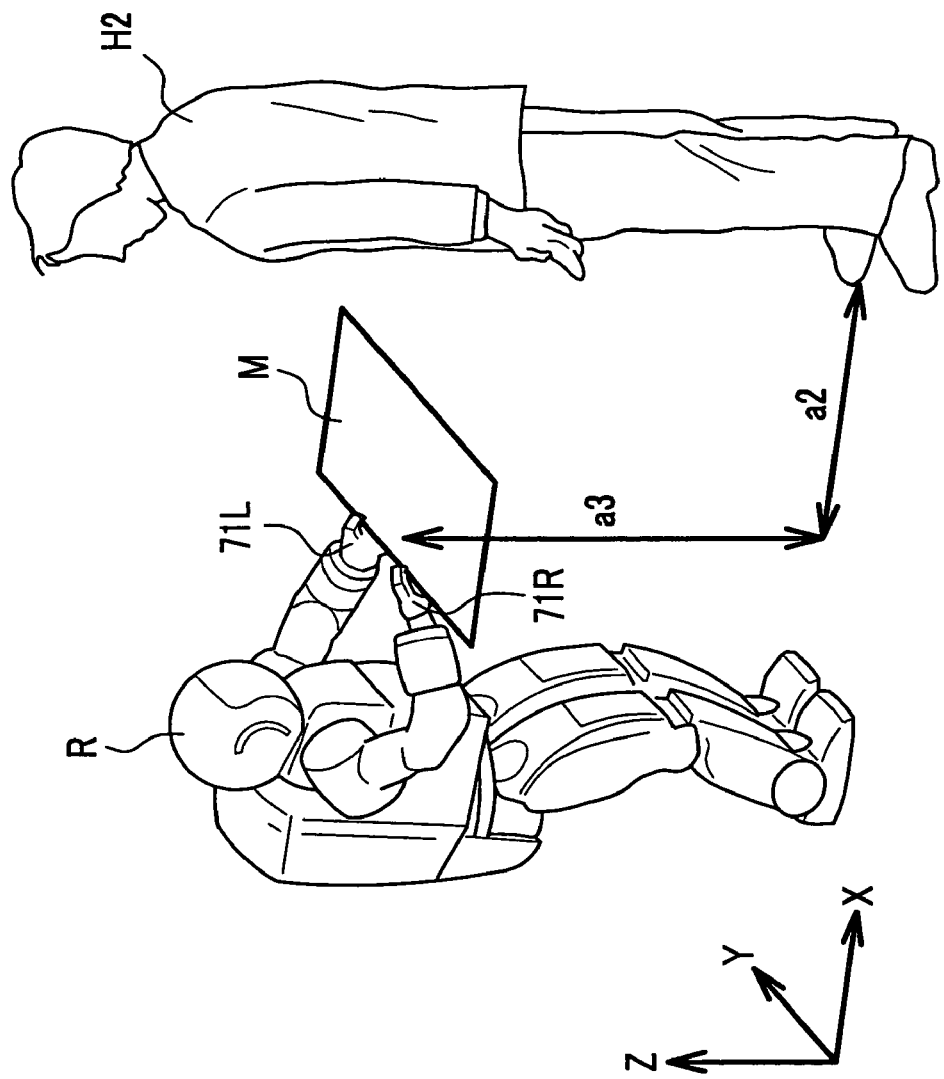
FIG. 26 is a perspective view to show a robot having moved to a passing position and holding gripping portions to a height for passing an item to a human.

As shown in FIGS. 25 and 26, after moving to the position for passing the item, the robot R holds the gripping portions 71 (71R, 71L) gripping the item M to the reception height determined by the receiving/passing height deciding means 242 (Step 81).

When the robot has completed in holding the gripping portions 71R, 71L thereto, the carrying state setting means 248 sets the carrying state as "passing-wait", and then the robot R utters "Please, receive the item M" (Step 82).

Figure 27:
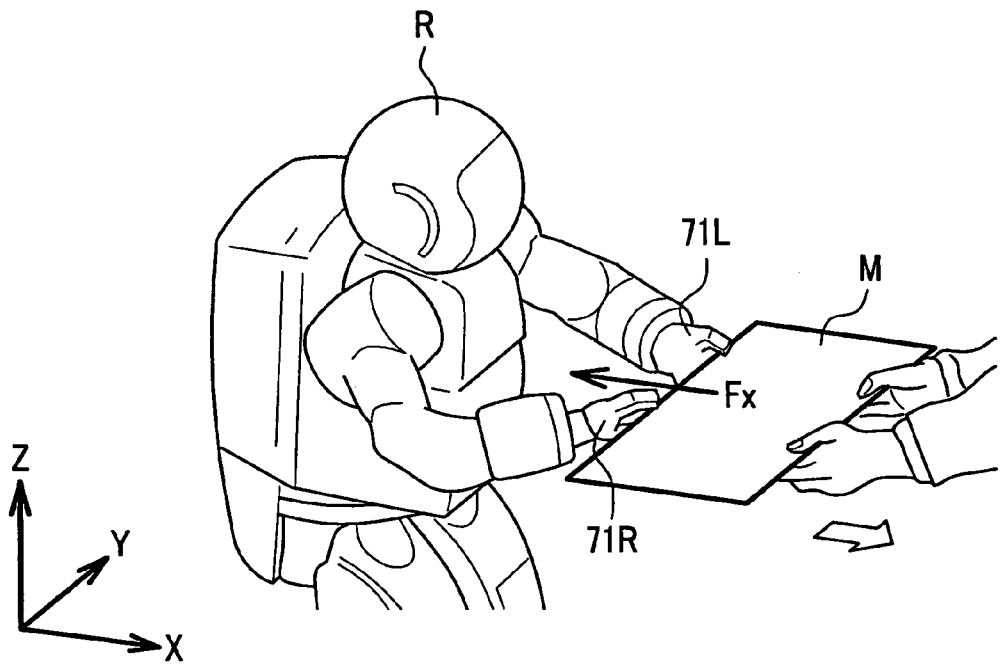
FIG. 27 is a drawing to show a robot having started passing an item to a human.

In the state the robot is waiting for the human to receive the item from the robot, if the six-axis force sensors 62R, 62L detect an external force Fx not less than the predetermined value Fx3, or if the gripping angle deviation θ is not more than the predetermined value θ2, for example θ=0 (Yes in Step 83), then the carrying state setting means 248 sets the carrying state as "passing the item to the human" and the robot R starts opening the gripping portions 71R, 71L (Step 84). In FIG. 27 is illustrated a situation in which the human H2 is about to receive the item M from the robot R.

In the state the robot is passing the item to the human, if the six-axis force sensors 62R, 62L detects a force Fx not more than the predetermined value Fx4 (Fx4≦Fx3) (Yes in Step 85), then the carrying state setting means 248 sets the carrying state as "passing the item is complete" (Step 86).

On completion of passing the item M to the human, the robot R uses the motion management means 210 to generate and then output to the robot managing unit 3 a motion reporting signal for reporting the completion of the task implementation (Step 87).

The robot R then moves from the receiving position to the home position (Step 88).

If the robot R dropped the item M while moving to carry it, then the carrying state setting means 248 sets the carrying state as "error", and the motion management means 210 generates and then outputs to the robot managing unit 3 a motion reporting signal for reporting the failure in carrying the item M.

In this embodiment, the receiving/passing motion deciding means 240 determines that the robot R has dropped the item M, if the gripping angle deviation θ is not more than a predetermined value θ5 (e.g., θ=0).

If the force Fx detected by the six-axis force sensors changes to a large extent while the robot R is moving to carry the item (because the item M struck against an obstacle, for example), then the robot R temporarily stops the autonomous movement and waits for the Fx to return to a normal value.

Similarly, when the cameras C, C have detected an obstacle in their front (e.g., a human passing in front of the robot), the robot R temporarily stops the autonomous movement and waits for the obstacle to be removed.

<Moving to the Item Storage Site>

Figure 28:
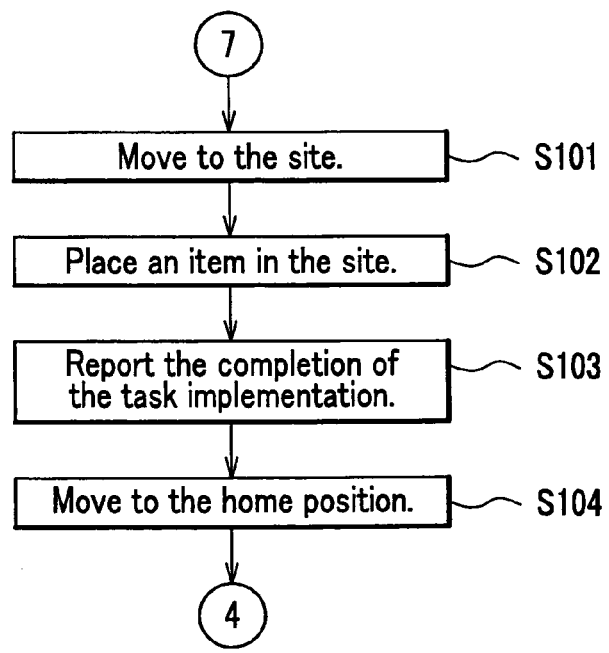
FIG. 28 is a flowchart to show an item-carrying operation by a robot control system according to an embodiment of the invention, in which a robot moves to an item storage site.

Next, movement of the robot R to the item storage site will be discussed. FIG. 28 is a flowchart to show an item-carrying operation by the robot control system according to an embodiment of the invention, in which the robot moves to the item storage site.

If the robot R has failed in searching the human H2 within a predetermined time period (Yes in Step 68), then it moves from the location where the human H2 is usually present P2 to the item storage site B1 (Step 101).

The robot R then places the item M in the item storage site B1 (Step 102), generates a motion reporting signal for reporting the placement of the item M in the item storage site B1, and outputs the signal to the robot managing unit 3 and a terminal 5 for use by the human H2 (Step 103). Thereafter, the robot R moves from the item storage site B1 to the home position (Step 104).

As discussed heretofore, the robot control system according to an embodiment of the invention has the following effects.

(1) When receiving an item from the human, the robot can determine that the human has completed receiving the item from the robot, by detecting a decrease in the pressing force of the item against the gripping portion which is caused when the human releases the hands from the item. Also the robot can prevent giving the human a sense that the item was forcefully taken away, by generating a gripping torque for gripping the item after completion of receiving the item.

(2) The robot determines the mastery level of the human of receiving (passing) an item from (to) the robot by using the time period from the receiving (passing) wait state to starting receiving (passing) the item, so as to perform a receiving (passing) motion according to the mastery level. Thus, the robot can perform the receiving (passing) motion depending on the mastery levels, i.e., slowly and quickly for low and high mastery levels, respectively.

(3) In receiving an item with both hands, the robot can check if they have successfully or failingly gripped the item even if the item is light and thin, by determining if the robot is gripping the item with both gripping portions. Further, even if the gripping has ended up in failure, it is possible to receive the item again (reperform the receiving motion).

(4) By performing motions depending on the position and body height of the human, the robot can decrease the load for the human and perform receiving/passing motion in a more natural manner. That is, because the robot performs motions in an adapted manner to the human, the load is decreased for the human to behave according to the robot motions.

(5) By utilizing a force in a horizontal direction out of the external forces from an item to control the receiving/passing motion, the robot can separately detect forces due to human motion and the self weight of the item, and thus prevent an erroneous motion due to the self weight of the item.

Although an embodiment of the present invention has been described above, the invention is not limited thereto but may be modified in construction as needed within the scope of the resent invention.

For example, the external force Fz in the Z axis detected by the six-axis force sensor may be used to determine if the robot has dropped the item in the carriage thereof, because when the item is dropped, Fz decreases and the sensor stops sensing the weight of the item.

The number and location, for example, of the joints of the robot may also be modified as needed.

Further, although the present embodiment employs a construction in which the receiving/passing motion deciding means, the human-position specifying means, the receiving/passing height deciding means, the body-height specifying means, the receiving/passing height deciding means, and the human specifying means are provided in the controlling sections installed in the robot, at least one of these means may be provided on the side of the robot managing unit.

What is claimed is:

1. An item-carrying system comprising:
a robot comprising:
a gripping portion for gripping an item, wherein the gripping portion is configured to open and close;
external force detecting means for detecting an external force applied to the gripping portion;
opening-degree detecting means for detecting an opening-degree of the gripping portion;
autonomous movement means; and
receiving/passing motion deciding means for deciding a motion of the robot in the item receiving/passing operation, the system receiving/passing the item with the gripping portion, wherein
the receiving/passing motion deciding means comprises:
means for determining to start receiving the item that causes the gripping portion to start a receiving motion if the external force detecting means has detected an external force not less than a first predetermined value, when the gripping portion is not gripping the item; and
means for determining the completion of a receiving motion that determines the completion of an item-receiving motion on the basis of at least one of an external force detected by the external force detecting means and an opening-degree detected by the opening-degree detecting means, during the receiving motion.

2. An item-carrying system as claimed in claim 1, wherein the means for determining the completion of a receiving motion determines that the receiving motion has completed if the external force is not more than a second predetermined value.

3. An item-carrying system as claimed in claim 1, wherein the means for determining the completion of a receiving motion determines that the receiving motion has completed if the opening degree is not more than a third predetermined value.

4. An item-carrying system as claimed in claim 1, wherein the receiving/passing motion deciding means causes the gripping portion to generate a gripping force if the means for determining the completion of a receiving motion has determined that the receiving motion has completed.

5. An item-carrying system as claimed in claim 4, wherein the system further comprises means for determining success/failure in gripping the item after the receiving/passing motion deciding means caused the gripping portion to generate a gripping force.

6. An item-carrying system as claimed in claim 5, wherein the means for determining success/failure in gripping the item determines the success/failure of the gripping motion if the opening degree is not more than a fourth predetermined value.

7. An item-carrying system as claimed in claim 5, wherein the receiving/passing motion deciding means reperforms the receiving motion if the means for determining success/failure in gripping the item has determined that the gripping motion is failed.

8. An item-carrying system as claimed in claim 5, wherein the robot comprises a pair of gripping portions for gripping the item.

9. An item-carrying system as claimed in claim 8, wherein the means for determining success/failure in gripping the item determines success/failure of the gripping motion on the basis of an external force generated from the item when the pair of gripping portions are moved closer to or apart from each other.

10. An item-carrying system as claimed in claim 9, wherein the means for determining success/failure in gripping the item determines the gripping motion as success or failure, if the external force is not less than or less than a fifth predetermined value, respectively, the external force being generated from the item when the pair of gripping portions are moved closer to or apart from each other and detected by the external force detecting means.

11. An item-carrying system as claimed in claim 1, wherein the gripping portion comprises:
a palm portion;
a first finger attached to the palm portion via a first joint; and
a second finger attached to the palm portion via a second joint, the gripping portion gripping the item with the first and the second fingers, and wherein
the opening-degree detecting means comprises:
first finger angle detecting means for detecting a first finger angle between the palm and the first finger; and
second finger angle detecting means for detecting a second finger angle between the palm and the second finger; and
calculating means for calculating the opening-degree from the first and second figure angles.

12. An item-carrying system as claimed in claim 1, wherein the external force detecting means can detect a horizontally directed external force, and wherein the receiving/passing motion deciding means uses a horizontally directed external force applied to the gripping portion as an external force from the item.

13. An item-carrying system as claimed in claim 12, wherein the external force detecting means is a six-axis force sensor.

14. An item-carrying system as claimed in claim 1, wherein the system further comprises:
human-position specifying means for specifying the position of a human; and
receiving/passing position deciding means for deciding, on the basis of the specified human-position, the position for the robot to receive/pass the item from/to the human, and then moving the robot to the receiving/passing position.

15. An item-carrying system as claimed in claim 1, wherein the system further comprises:
body-height specifying means for specifying the body-height of the human; and
receiving/passing height deciding means for deciding, on the basis of the specified human-body height, the height for the robot to receive/pass the item from/to the human, and then moving the gripping portion to the receiving/passing height.

16. An item-carrying system as claimed in claim 1, wherein the system comprises human-specifying means for specifying the human to whom to pass the item, on the basis of a task instruction signal.

* * * * *